United States Patent
Whalen et al.

(10) Patent No.: US 12,346,447 B2
(45) Date of Patent: Jul. 1, 2025

(54) SYSTEMS, METHODS, AND GRAPHICAL USER INTERFACES FOR CONFIGURING AND IMPLEMENTING COMPUTER-EXECUTABLE DETECTION INSTRUCTIONS IN A CYBERSECURITY THREAT DETECTION AND MITIGATION PLATFORM

(71) Applicant: Expel, Inc., Herndon, VA (US)

(72) Inventors: Dan Whalen, Herndon, VA (US); Patrick Edgett, Westminster, CO (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 18/793,483

(22) Filed: Aug. 2, 2024

(65) Prior Publication Data

US 2025/0036765 A1    Jan. 30, 2025

Related U.S. Application Data

(63) Continuation-in-part of application No. 18/749,222, filed on Jun. 20, 2024.

(Continued)

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC .................. G06F 21/566; G06F 2221/034
See application file for complete search history.

(56) References Cited

U.S. PATENT DOCUMENTS

| 9,246,941 | B1 * | 1/2016 | Gibson | ............... H04L 63/20 |
| 10,250,623 | B1 * | 4/2019 | Patton | ............... G06F 21/00 |

(Continued)

FOREIGN PATENT DOCUMENTS

| CN | 103888480 A | * | 6/2014 | ............ H04L 29/06 |
| EP | 3086189 B1 | * | 5/2024 | ............ B25J 11/00 |

*Primary Examiner* — Christopher A Revak
(74) *Attorney, Agent, or Firm* — Padowithz Alce; Alce PLLC

(57) ABSTRACT

A system, method, and computer-program product includes obtaining a third-party security event of a subscriber, generating a technology source-agnostic security event signal for the third-party security event based on routing the third-party security event to an event normalization service, identifying a technology source-agnostic security event signal type that corresponds to the technology source-agnostic security event signal based on generating the technology source-agnostic security event signal, retrieving a corpus of computer-executable detection instructions digitally mapped to the technology source-agnostic security event signal type based on querying a detection instructions retrieval application programming interface (API), assessing the technology source-agnostic security event signal against each computer-executable detection instruction included in the corpus of computer-executable detection instructions, and generating, via the one or more processors, a prospective security alert based on the technology source-agnostic security event signal satisfying a set of alerting conditions of one of the computer-executable detection instructions.

19 Claims, 34 Drawing Sheets

Related U.S. Application Data

(60) Provisional application No. 63/533,238, filed on Aug. 17, 2023, provisional application No. 63/521,968, filed on Jun. 20, 2023.

(56) References Cited

U.S. PATENT DOCUMENTS

| | | | |
|---|---|---|---|
| 10,366,229 B2* | 7/2019 | Martin | G06F 21/554 |
| 11,343,265 B2* | 5/2022 | Lotem | H04L 63/145 |
| 2015/0381637 A1* | 12/2015 | Raff | H04L 63/0218 |
| | | | 726/23 |
| 2017/0237766 A1* | 8/2017 | Mattson | G06F 21/568 |
| | | | 726/23 |
| 2017/0286671 A1* | 10/2017 | Chari | G06F 21/552 |
| 2022/0171847 A1* | 6/2022 | Bursell | G06F 21/53 |
| 2023/0224312 A1* | 7/2023 | Duffy | H04L 41/22 |
| | | | 726/22 |
| 2024/0289044 A1* | 8/2024 | Sethi | G06F 3/067 |
| 2024/0362335 A1* | 10/2024 | Biondi | G06F 21/566 |

\* cited by examiner

200

Obtaining Raw Security Events S210

Transforming Raw Security Events to Technology Source-Agnostic Security Event Signals S220

Assessing Technology Source-Agnostic Security Event Signals S230

Generating Automated Detection Decisioning Workflows S240

Routing Service-Validated Security Alerts S250

FIGURE 2

| Signal Type | Alert Name | Categories |
|---|---|---|
| Vendor Event | API event from a suspicious location | Suspicious User Activity |
| Anomaly Duet | Anomaly Alert | |
| Authentication Event | Suspicious authentication activity | Suspicious Authentication |
| Authentication Event | Suspicious authentication | Suspicious Authentication |
| Break Glass Event | Breakglass Account Alert | Suspicious User Activity |
| Risky Configuration change Duet | Configuration Change Alert- {{evidence"messages"}} | |
| Risky Configuration change Duet | Configuration Change Alert from suspicious IP - {{evidence"messages"}} | |
| Vendor Alert | {{evidence"event_types"}} | Suspicious User Activity |
| Mfa Event | Multiple Failed or Rejected MFA Events | Suspicious Authentication |
| Vendor Alert | {{evidence"event_types"}} | Suspicious User Activity |
| Kubernetes Control Plane Event | Kubernates Port Forwarding to Pod | Suspicious User Activity |

FIGURE 6 (Cont...)

|  |  | Logout |
|---|---|---|
|  |  |  |
|  |  | + |
| MITRE Tactics | Tags |  |
| Discovery |  | edit |
|  | DUET:anomaly_alert | edit |
| Initial Access |  | edit |
| Initial Access |  | edit |
|  |  | edit |
|  | DUET:config_change_duet | edit |
|  |  | edit |
| Impact |  | edit |
| Initial Access |  | edit |
| Impact |  | edit |
| Lateral Movement |  | edit |

FIGURE 6 (Cont...)

expel  Refractor  Alert Taxonomy ▾  Signal From Anywhere ▾  Legacy Engine ▾

Signal From Anywhere/Common Detections/Authentication from a suspicious IP

| Create a new version | Authentication from a suspicious IP |
|---|---|
| 1. 2f9bcd91<br>created 2/27/2023 | Logic  Conversation  Compare  Simulations  Extensions |

Name

Authentication from a suspicious IP

The name of the common detection
(e.g. "Suspicious Login from known Tor node")

Description

A successful authentication was observed with a suspicious IP

Describe this common detection
☐ Acceptance Testing
Any alerts will surface at the "TESTING" serverity, regardless of any modication by an extension

Organization Scope

[all organizations]  one organization

Alert Taxonomy

Suspicious Authentication

This detection will trigger workflows related to the specified alert taxonomy

Author Type

Expel

Whether the detection logic is primarily expel's or its respective vendor's
Rate Limit Limit the number of Expel Alerts emitted

| 1 alert every | 5 | minutes |

⚗ Tests

FIGURE 7A

| | | | |
|---|---|---|---|
| | | | Logout |

Unique By One or more evidence paths which together define alert uniqueness.

| integration | detection | organization | |
|---|---|---|---|
| evidence | source_ips | | 🗑 |
| evidence | source_usernames | | 🗑 |
| + add unique by evidence | | | ⋮ + |

FIGURE 7A (Cont...)

Tests
First, find some example device events that should trigger this detection

Signal Logic

Signal Type
Authentication Event
This detection will run for events with the specific signal type Conditions

| evidence | actions | | matches any of |
| --- | --- | --- | --- |

+add a path

At least one element on the left hand side matches at least one of the following:
exactly | literal | ALLOW
+add a matcher  +bulk add

| evidence | source_ips | | is malicious scar | | matches any of |
| --- | --- | --- | --- | --- | --- |

+ add a path

At least one element on the left hand side matches at least one of the following:
exactly | literal | True
+add a matcher  +bulk add Actions

FIGURE 7B

Devices

| Filter detections... | | | | |
|---|---|---|---|---|
| Name ⊕ | Last Touched By | Last Deployed | Severity | Alert Taxonomy |
| API Activity with suspicious user agent | John Carfaro | 9/21/2023, 12:32:24PM | LOW | Suspicious User Activity |
| AWS Access Key Enumeration | Ian Cooper | 5/20/2024, 2:45:48 PM | TESTING | - |
| AWS CloudTrail bucket modification | Daniel Bolton | 10/25/2023, 3:13:36 PM | LOW | Suspicious User Activity |
| AWS Cloudtrail-AWS Lambda backdoor tracker | John Carfaro | 9/6/2023, 11:48:41 AM | TESTING | - |
| AWS Cloudtrail-Access Key Generated | John Carfaro | ... | TESTING | Suspicious Authentication |
| AWS Cloudtrail Downgrade | John Carfaro | 10/12/2023, 11:28:45 AM | MEDIUM | - |
| AWS Cognito unauthenticated logins enabled | Daniel Bolton | 10/18/2023, 2:06:55 PM | MEDIUM | Suspicious User Activity |
| AWS Detector deleted or disabled | Jim Thavisouk | 10/12/2023, 9:52:39 AM | TUNING | Suspicious User Activity |
| AWS ECR image tags set to mutable | Daniel Bolton | 10/17/2023, 1:05:05 PM | LOW | Suspicious User Activity |
| AWS Highly Privileged Role Assumption | Daniel Bolton | ... | TUNING | Suspicious User Activity |
| AWS Instance Limits Enumerated via GameLift | John Carfaro | 10/2/2023, 8:39:08 PM | MEDIUM | Suspicious User Activity |
| AWS KMS key deletion | Daniel Bolton | 10/11/2023, 11:44:03 AM | TUNING | Suspicious User Activity |
| AWS Metal Instance Created | John Carfaro | 10/5/2023, 2:51:28 PM | MEDIUM | Suspicious User Activity |

FIGURE 10

| Normalizers | Signals | Detections | |
|---|---|---|---|
| Signal Type | Alert Name | Categories | MITRE Tactics |
| Api Activity | SFA-API Activity with suspicious user agent | Suspicious User Activity | Intial Access |
| Api Activity | SFA-AWS Access Key Enumeration | Suspicious User Activity | Discovery |
| Api Activity | SFA-AWS CloudTrail bucket modification | Suspicious User Activity | Defense Evasion |
| Api Activity | SFA-Potential Lambda function backdoor | Suspicious User Activity | Execution, Persistance, Resource Development |
| Authentication | SFA-Workbench Suppression Test | Suspicious Authentication | |
| Api Activity | SFA-AWS CloudTrail Downgrade | Suspicious User Activity | Defense Evasion |
| Api Activity | SFA-AWS Cognito unauthenticated logins enabled | Suspicious User Activity | Discovery |
| Api Activity | SFA-AWS Detector deleted or disabled | Suspicious User Activity | Defense Evasion |
| Api Activity | SFA-AWS ECR Image tags set to mutable | Suspicious User Activity | Persistance |
| Authentication | SFA-AWS Highly Privileged Role Assumption | Suspicious User Activity | Privilege Escatation |
| Api Activity, Api Activity | SFA-AWS Instance Limits Enumerated via Gamelift | Suspicious User Activity | Impact |
| Api Activity | SFA-AWS KMS key detection | Suspicious User Activity | Privilege Escatation |
| Api Activity | SFA-AWS Metal Instance Created | Suspicious User Activity | Persistance |

FIGURE 10 (Cont...)

| Extensions | Settings | |
|---|---|---|
| Tags | | |
| Workflow:susp_login  datadog:rosy_suspicious_login_notify  Workflow:recent_mfa  Workflow:dog_auth  datadog:rosy_alert  datadog:multicloud_rules  datadog:rosy_suspicious_login  datadog:rosy_suspicious_login_notify | | edit edit |
| datadog:aws | | edit |
| datadog:aws-rules | | edit |
| datadog:Persistance  datadog:high_risk  datadog:aws_rules | | edit |
| | | edit |
| datadog:notice-all  datadog:aws-rules  datadog:rosy_suspicious_login  workflow_susp_login | | edit |
| datadog:aws-rules | | edit |
| datadog:notice-all  datadog:aws-rules  workflow_susp_login  datadog:rosy_suspicious_login | | edit |
| datadog:defense_evasion  datadog:aws-rules | | edit |
| datadog:rule_custom | | edit |
| datadog:Impact | | edit |
| datadog:aws | | edit |

FIGURE 10 (Cont...)

| Devices |
|---|
| Create a new version |
| 427caf22 deployed 12/11/2023 |

| Normalizers | Signals |
|---|---|

Authentication from suspicious country

| Logic | Conversation | Compare | Simulations | Extensions |
|---|---|---|---|---|

Name

Authentication from suspicious country

The name of the common detection (e.g. "Suspicious Login from known Tor node")

Description

Detects authentication from countries that the customer has said they do not ever expect to see.

Describe this common detection

Triage Considerations

Enter triage considerations

Displays in the Rule Detail modal of Workbench. Visible only to Expel employees. Use markdown to format contents ☑ Acceptance Testing

Any alerts will surface at the "TESTING" severity, regardless of any modification by an extension

Organization Scope

| all organizations | one organization |

Alert Taxonomy

This detection will trigger workflows related to the specified alert taxonomy

Author Type

Expel

Whether the detection logic is primarily expel's or its respective vendor's

Rate Limit Limit the number of Expel Alerts emitted

| 1 alert every | 4320 | minutes |

⚠ Tests

FIGURE 11

| Detections | Extensions | Settings |
|---|---|---|

Unique By One or more evidence paths which together define alert uniqueness.

| integration | detection | organization |
|---|---|---|
| evidence by name | actor.user.uuid | |

+ add unique by evidence

FIGURE 11 (Cont...)

| 1 alert every | 4320 | minutes |

🧪 Tests
First, find some example device events that should trigger this detection Name
Test case 1

Device Events
one or more device events which will trigger the detection

| aws | Raw Event |

Stubs
Override values for detection conditions as country codes

Signal Logic

Signal Type
Authentication

This detection will run for events with the specified signal type

Conditions

| Customer config | detect.alert.authentication.suspicious_countries | .. |  |

+ add a path

| evidence by type | source_ips | as country codes |  |

+ add a path

Tests (1/1 passing) ●

FIGURE 12

| integration | detection | organization | |
|---|---|---|---|
| evidence by name | actor.user.uuid | | 🗑 |

+ add unique by evidence

"NG"

is not empty
The left hand side contains at least one element matches any of
At least one element on the left hand side matches at laest one of the following:
| exactly | customer config | detect.alert.authentication.suspicious_countries | 🗑 |

+add a matcher  +bulk add

FIGURE 12 (Cont...)

| aws | | 🗑 |
|---|---|---|

Stubs
Overide values for detection conditions

| as country codes |
|---|

Signal Logic

Signal Type

| Authentication |
|---|

This Detection will run for events with the specified signal type

Conditions

| customer config | detect.alert.authentication.suspicious_countries | ... | 🗑 |
|---|---|---|---|

+ add a path

| evidence by type | source_ips | as country codes | 🗑 |
|---|---|---|---|

+ add a path

| evidence by type | source_ips | ... | 🗑 |
|---|---|---|---|

+ add a path

| evidence by name | api_operation | ... | 🗑 |
|---|---|---|---|

+ add a path

| evidence by name | source_ips | ... | 🗑 |
|---|---|---|---|

+ add a path

is not empty
The left hand side contains at least one element matches any of
At least one element on the left hand side matches at least one of the following
| exactly | Customer config | detect.alert.authentication suspicious_countries |
+ add a matcher  + bulk add matches any of
At least one element on the left hand side matches at least one of the following
| regex | literal | ^(?:[0-9]{1,3}1)(3)[0-9]{1,3}$ |
+ add a matcher  + bulk add matches any of
At least one element on the left hand side matches at least one of the following
| exactly | literal | ConsoleLogin |
+ add a matcher  + bulk add matches any of
At least one element on the left hand side matches at least one of the following
| exactly | literal | Success |
+ add a matcher  + bulk add FIGURE 13 (Cont...)

+ add a path

| evidence by name | api operation | ... | 🗑 |

+ add a path

| evidence by name | status | ... | 🗑 |

+ add a path add correlated signal

Actions

Alert On
ExpetAlerts are sent to eork bench for review by the SOC
Alert Name

SFA-Authentication from country in customer suspicious list

Evidence can be interpolated using the syntax {{evidence"source_username"}} or {{ evidence_by_name"api.operation"}}
MITRE Tactics TA0006 - Credential Access ×

Expel Categories

[Suspicious Authentication ×][Suspicious User Activity ×]

Severity

Medium

Expel Tags datadog rosy_alert datadog multicloud_rules datadog rosy_suspicious_login Tests (1/1 passing)  ●

FIGURE 14

| regex | literal | ^(?(0.9)(1.3)/1)(3)(0.9)(1.3)S | 🗑 |

+ add a matcher  + bulk add matches any of
At least one element on the left hand side matches at least one of the following:

| exactly | literal | ConsoleLogin | 🗑 |

+ add a matcher  + bulk add matches any of
At least one element on the left hand side matches at least one of the following:

| exactly | literal | Success | 🗑 |

+ add a matcher  + bulk add

FIGURE 14 (Cont...)

| as country codes |

Signal Logic

Signal Type

| Api Activity |

This detection will run for events with the specified signal type

Conditions

| evidence by type | source_ips | ... | 🗑 |

+ add a path

| customer config | detect alert authentication expected_countries | ... | 🗑 |

+ add a path

| evidence by type | source_ips | ... | 🗑 |

+ add a path

| evidence by name | api response operation | ... | 🗑 |

+ add a path

| evidence by name | api response message | ... | 🗑 |

+ add a path

+ add correlated signal

FIGURE 15

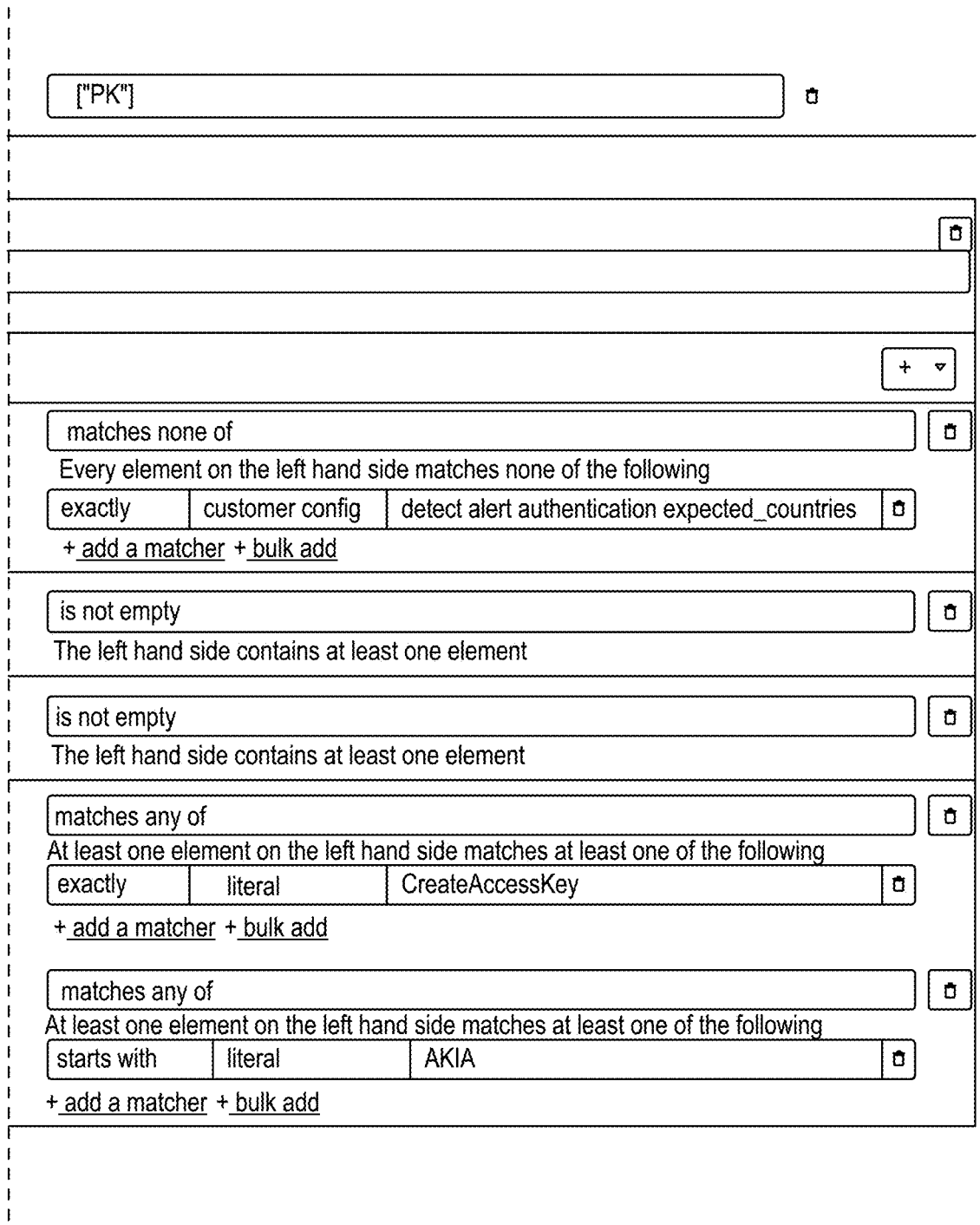
FIGURE 15 (Cont...)

| evidence by name | api.operation | - | 🗑 |

+ add a path

| evidence by name | api.response.meaaage | - | 🗑 |

+ add a path add.coorelated.signal

Actions

Alert On
ExpetAlert are sent to workbench for review by the SOC.
Alert name

| SFA-Access key created from an unauthorized country |

Evidence can be inerpointed using the syntax {{ evidence "source_username"}} or {{ evidence_by name "api.operation"}}
MITRE Tactics

| TA0003 - Persistence × |

Expel Categories

| Suspicious User Activity × |

Severity

| Testing |

Expel Tags

| workflow:susp-login |

| datadog:aws-rules |

| datadog:initial-access |

+ add a tag

[Create new version]

Tests (1/1 passing) ●

FIGURE 16

| matches any of | | | 🗑 |
|---|---|---|---|
| At least one element on the left hand side matches at least one of the following: | | | |
| exactly | literal | CreateAccessKey | 🗑 |

+ add a matcher  + bulk add

| matches any of | | | 🗑 |
|---|---|---|---|
| At least one element on the left hand side matches at least one of the following: | | | |
| starts with | literal | AKIA | 🗑 |

+ add a matcher  + bulk add

FIGURE 16 (Cont...)

Signal Type

Api Activity

This detection will run for events with the specified signal type

Conditions

| evidence by name | api.response.error | .. | |

\+ add a path

| evidence by name | src_endpoint.domain | .. | |

\+ add a path

| evidence by name | actor.user.account.uid | .. | |

\+ add a path

| evidence by type | user_agents | .. | |

\+ add a path

Threshold Condition
Threshold

| customer config | detect.threshold.discovery.num_aws-denies | times |

Time range

| 30 | minutes | add correlated signal

Tests (1/1 passing)  •

FIGURE 18 matches any of
At least one element on the left hand side matches at least one of the following:

| exactly | literal | AccessDenied |

+ add a matcher + bulk add matches none of
Every element on the left hand side matches none of the following:

| contains | literal | amazonaws.com |

+ add a matcher + bulk add matches none of
Every element on the left hand side matches none of the following:

| exactly | literal | ANONYMOUS_PRINCIPAL |

+ add a matcher + bulk add matches any of
At least one element on the left hand side matches at least one of the following:

| contains | literal | python |
| contains | literal | python |

+ add a matcher + bulk add

Evidence Paths
Pieces of evidence to correlate on (e.g. Username must match)

| evidence by name | actor.user.name |

+ add an evidence path

Distinct Path
A Distinct Path differentiaces threshold events by their evidence and the collection of unique groups of repositories deleted from the same source ip in a 10 minute window)

| evidance by name | api.operation |

FIGURE 18 (Cont...)

SYSTEMS, METHODS, AND GRAPHICAL USER INTERFACES FOR CONFIGURING AND IMPLEMENTING COMPUTER-EXECUTABLE DETECTION INSTRUCTIONS IN A CYBERSECURITY THREAT DETECTION AND MITIGATION PLATFORM

CROSS-REFERENCE TO RELATED APPLICATIONS

This application claims the benefit of U.S. Provisional Application No. 63/533,238, filed 17 Aug. 2023, and is a continuation-in-part of U.S. patent application Ser. No. 18/749,222, filed 20 Jun. 2024, which claims the benefit of U.S. Provisional Application No. 63/521,968, filed 20 Jun. 2023, which are incorporated in their entireties by this reference.

TECHNICAL FIELD

This invention relates generally to the cybersecurity field, and more specifically to new and useful cyber threat detection and mitigation systems and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slow down the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets. The embodiments of the present application described herein provide technical solutions that address, at least the need described above.

BRIEF SUMMARY OF THE INVENTION(S)

In one embodiment, a computer-implemented method for accelerating a detection of a cybersecurity threat includes obtaining, via one or more processors, a third-party security event that involves a digital asset or computing asset of a subscriber; generating a technology source-agnostic security event signal for the third-party security event based on routing the third-party security event to an event normalization service; identifying, via the one or more processors, a technology source-agnostic security event signal type that corresponds to the technology source-agnostic security event signal in response to generating the technology source-agnostic security event signal; retrieving, via the one or more processors, a corpus of computer-executable detection instructions digitally mapped to the technology source-agnostic security event signal type based on querying a detection instructions retrieval application programming interface (API); assessing, via the one or more processors, the technology source-agnostic security event signal against each computer-executable detection instruction included in the corpus of computer-executable detection instructions; and generating, via the one or more processors, a prospective security alert based on the technology source-agnostic security event signal satisfying a set of alerting conditions of one of the computer-executable detection instructions of the corpus of computer-executable detection instructions.

In one embodiment, the one of the computer-executable detection instructions of the corpus of computer-executable detection instructions is configured to assign a predetermined degree of threat severity to the prospective security alert based on the technology source-agnostic security event signal satisfying the set of alerting conditions of the one of the computer-executable detection instructions, the one of the computer-executable detection instructions of the corpus of computer-executable detection instructions is configured to assign a predetermined alert name to the prospective security alert based on the technology source-agnostic security event signal satisfying the set of alerting conditions of the one of the computer-executable detection instructions, and the one of the computer-executable detection instructions of the corpus of computer-executable detection instructions is configured to assign a predetermined security threat classification or attack strategy to the prospective security alert based on the technology source-agnostic security event signal satisfying the set of alerting conditions of the one of the computer-executable detection instructions.

In one embodiment, the computer-implemented method further includes: assessing, via the one or more processors, the prospective security alert against a corpus of computing environment data of the subscriber; determining, via the one or more processors, the prospective security alert involves a critical computing asset of the subscriber based on assessing the prospective security alert against the corpus of computing environment data of the subscriber; and routing, via the one or more processors, the prospective security alert to an alert queue based on the prospective security alert being a valid security alert.

In one embodiment, assessing, via the one or more processors, the prospective security alert against one or more alert suppression instructions configured for the subscriber; identifying, via the one or more processors, the prospective security alert as a suppressible alert based on the prospective security alert satisfying one of the one or more alert suppression instructions; and routing, via the one or more processors, the prospective security alert to an alert disposal queue based on the prospective security alert being identified as the suppressible alert.

In one embodiment, the third-party security event is one of: a raw security event obtained from a security information and event management (SIEM) security device associated with the subscriber, a raw security event obtained from a third-party security device or third-party security application, and a raw security event obtained from a cloud-based security device that is configured to monitor a cloud environment of the subscriber.

In one embodiment, each distinct computer-executable detection instruction of the corpus of computer-executable detection instructions is configured to assess the technology source-agnostic security event signal against a distinct set of predefined alerting conditions, and each distinct computer-executable detection instruction of the corpus of computer-executable detection instructions is configured to generate a corresponding prospective security alert based on satisfying the distinct set of predefined alerting conditions associated with that distinct computer-executable detection instruction.

In one embodiment, the corpus of computer-executable detection instructions includes a first computer-executable detection instruction, a second computer-executable detection instruction, and a third computer-executable detection instruction, the first computer-executable detection instruction is configured to generate a first type of prospective security alert based on the technology source-agnostic security event signal satisfying the distinct set of predefined alerting conditions of the first computer-executable detection instruction, the second computer-executable detection instruction is configured to generate a second type of prospective security alert based on the technology source-agnostic security event signal satisfying the distinct set of predefined alerting conditions of the second computer-executable detection instruction, the third computer-executable detection instruction is configured to generate a third type of prospective security alert based on the technology source-agnostic security event signal satisfying the distinct set of predefined alerting conditions of the third computer-executable detection instruction, and the first type of prospective security alert, the second type of prospective security alert, and the third type of prospective security alert each correspond to a distinct type of prospective security alert.

In one embodiment, the corpus of computer-executable detection instructions digitally mapped to the technology source-agnostic security event signal type includes a first plurality of computer-executable detection instructions, a second corpus of computer-executable detection instructions digitally mapped to a second technology source-agnostic security event signal type includes a second plurality of computer-executable detection instructions, and a total number of computer-executable detection instructions included in the corpus of computer-executable detection instructions is different than a total number of computer-executable detection instructions included in the second corpus of computer-executable detection instructions.

In one embodiment, querying the detection instructions retrieval application programming interface (API) includes automatically constructing, via the one or more processors, an API call that includes the technology source-agnostic security event signal type as a search parameter, and receiving the corpus of computer-executable detection instructions digitally mapped to the technology source-agnostic security event signal type is further based on executing the API call.

In one embodiment, a first subset of computer-executable detection instructions of the corpus of computer-executable detection instructions includes a set of heuristics-based detection instructions, and a second subset of computer-executable detection instructions of the corpus of computer-executable detection instructions includes a set of machine learning-based detection instructions that includes using one or more machine learning models.

In one embodiment, the computer-implemented method further includes instantiating, via the one or more processors, a detection-building graphical user interface for constructing a target automated detection instruction based on receiving a request from a user, wherein the detection-building graphical user interface includes a plurality of detection-identifying user interface input elements configured to receive, from the user, one or more strings of text that characterize the target automated detection instruction, and a set of user interface buttons, that when operated, is configured to control whether the target automated detection instruction is used for only the subscriber or across all subscribers subscribing to a cybersecurity event detection and response service.

In one embodiment, the detection-building graphical user interface further includes an automated investigations control button that, when selected, is configured to display a drop-down menu element of a plurality of alert taxonomies, the automated investigations control button is configured to receive a selection, from the user, of one of the plurality of alert taxonomies, and the target automated detection instruction, when executed, is configured to execute a set of automated investigation workflows digitally mapped to the one of the plurality of alert taxonomies based on receiving the selection of the one of the plurality of alert taxonomies from the user.

In one embodiment, the computer-implemented method further includes instantiating, via the detection-building graphical user interface, a detection instruction simulation container based on receiving an input, from the user, selecting a detection simulation addition control button of the detection-building graphical user interface, wherein the detection instruction simulation container is configured to receive, from the user, input of: a sample raw event generated by a target third-party security service or a target third-party security application for validating that the target automated detection instruction is executed correctly in response to normalizing the sample raw event and providing the normalized sample raw event to the target automated detection instruction.

In one embodiment, the computer-implemented method further includes: instantiating, via the detection-building graphical user interface, a detection instruction execution container based on receiving an input, from the user, selecting a detection instruction execution control button of the detection-building graphical user interface, wherein the detection instruction execution container includes: a signal type user interface element that, when selected, displays a drop-down menu element of a plurality of technology source-agnostic event signal types provided by the cybersecurity event detection and response service, and one or more condition-setting user interface elements being configured to receive inputs of characters that define one or more alert generation conditions that must be satisfied prior to generating a subject prospective security alert using the target automated detection instruction.

In one embodiment, the computer-implemented method further includes: instantiating, via the detection-building graphical user interface, a detection instruction response container based on receiving an input, from the user, selecting a detection instruction response control button of the detection-building graphical user interface, wherein the detection instruction response container includes: a set of user interface input elements configured to receive user input specifying alert attributes of the subject prospective security alert, wherein the set of user interface input elements includes: a first user interface input element configured to receive an input of an alert name that is assigned to the subject prospective security alert when the one or more alert generation conditions are satisfied, a second user interface input element configured to receive an input of a degree of threat severity that is assigned to the subject prospective security alert when the one or more alert generation conditions are satisfied, and a third user interface input element configured to receive an input of a security threat classification or attack strategy that is assigned to the subject prospective security alert when the one or more alert generation conditions are satisfied.

In one embodiment, a computer-program product embodied in a non-transitory machine-readable storage medium storing computer instructions that, when executed by one or more processors, perform operations including: receiving a third-party security event that involves a digital asset or computing asset of a subscriber; generating a technology source-agnostic security event signal for the third-party security event based on routing the third-party security event to an event normalization service; identifying a technology source-agnostic security event signal type corresponding to the technology source-agnostic security event signal in response to generating the technology source-agnostic security event signal; obtaining a corpus of computer-executable detection instructions digitally mapped to the technology source-agnostic security event signal type based on querying a detection instructions retrieval application programming interface (API); assessing the technology source-agnostic security event signal against each computer-executable detection instruction included in the corpus of computer-executable detection instructions; and generating at least one prospective security alert based on the technology source-agnostic security event signal satisfying a set of alerting conditions of at least one of the computer-executable detection instructions of the corpus of computer-executable detection instructions.

In one embodiment, generating the at least one prospective security alert includes generating a first prospective security alert of a first type and a second prospective security alert of a second type that is different than the first type, the at least one of the computer-executable detection instructions of the corpus of computer-executable detection instructions generates the first prospective security alert and the second prospective security alert.

In one embodiment, generating the at least one prospective security alert includes: generating a first prospective security alert of a first type based on satisfying a set of alerting conditions of a first computer-executable detection instruction of the corpus of computer-executable detection instructions, generating a second prospective security alert of a second type based on satisfying a set of alerting conditions of a second computer-executable detection instruction of the corpus of computer-executable detection instructions, and the first computer-executable detection instruction and the second computer-executable detection instruction are not the same computer-executable detection instruction.

In one embodiment, the corpus of computer-executable detection instructions only includes computer-executable detection instructions that are configured to evaluate subject technology source-agnostic security event signals of the technology source-agnostic security event signal type.

In one embodiment, the technology source-agnostic security event signal is processable by a cybersecurity event detection and response service irrespective of a third-party security device or service from which the third-party security event originated.

In one embodiment, automatically mitigating a security threat associated with prospective security alert based on executing one or more automated remediation actions that resolves the security threat associated with the prospective security alert.

In one embodiment, a computer-implemented system includes one or more processors; a memory; a computer-readable medium operably coupled to the one or more processors, the computer-readable medium having computer-readable instructions stored thereon that, when executed by the one or more processors, cause a computing device to perform operations including: obtaining, via one or more processors, a third-party security event that involves a digital asset or computing asset of a subscriber; generating a technology source-agnostic security event signal for the third-party security event based on routing the third-party security event to an event normalization service; identifying, via the one or more processors, a technology source-agnostic security event signal type that corresponds to the technology source-agnostic security event signal in response to generating the technology source-agnostic security event signal; retrieving, via the one or more processors, a corpus of computer-executable detection instructions digitally mapped to the technology source-agnostic security event signal type based on querying a detection instructions retrieval application programming interface (API); assessing, via the one or more processors, the technology source-agnostic security event signal against each computer-executable detection instruction included in the corpus of computer-executable detection instructions; and generating, via the one or more processors, a prospective security alert based on the technology source-agnostic security event signal satisfying a set of alerting conditions of one of the computer-executable detection instructions of the corpus of computer-executable detection instructions.

BRIEF DESCRIPTION OF THE FIGURES

FIG. 2 illustrates an example method 200 in accordance with one or more embodiments of the present application;

FIGS. 6-7C illustrate example graphical user interfaces of configuring automated detection decisioning workflows in accordance with one or more embodiments of the present application;

FIG. 10 illustrates an example of a graphical user interface displaying a plurality of representations of computer-executable detection instructions in accordance with one or more embodiments of the present application;

FIGS. 11-18 illustrate example graphical user interfaces for configuring computer-executable detection instructions in accordance with one or more embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
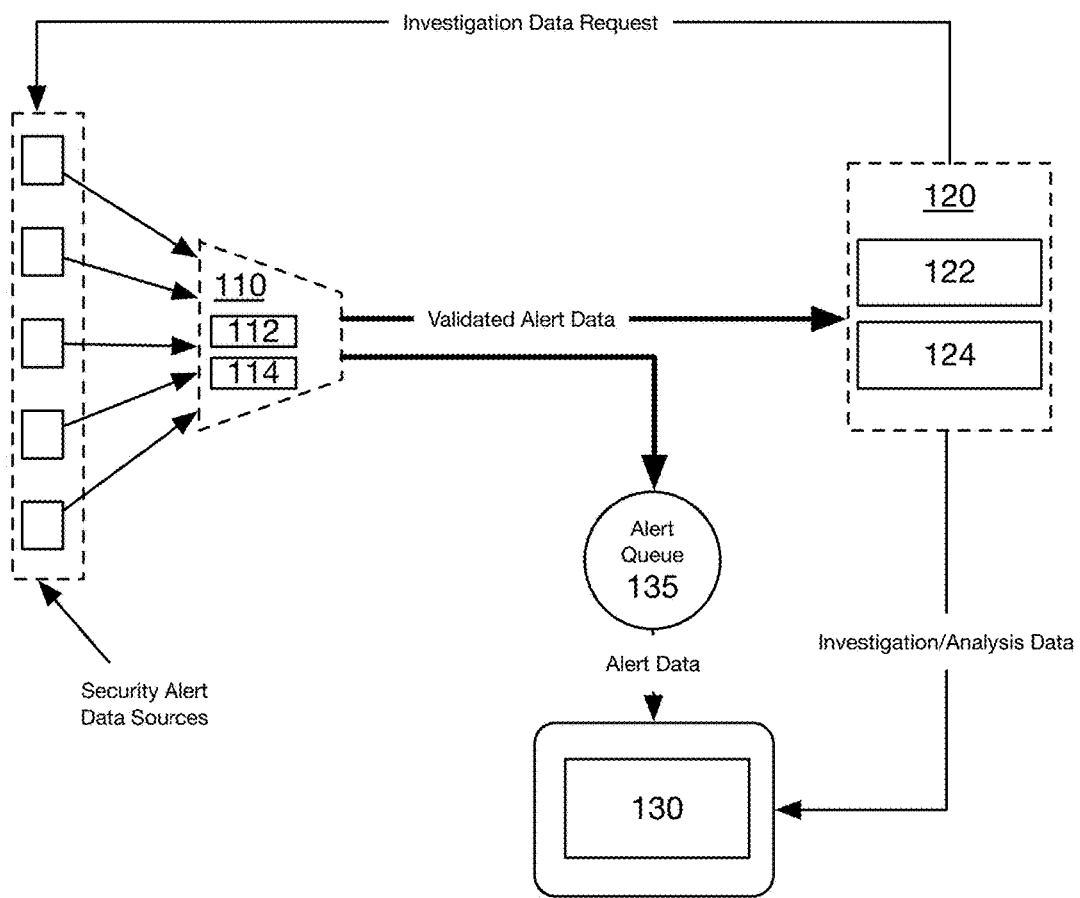
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100 or a cybersecurity event detection and response service.

The system 100 may function to enable real-time cybersecurity threat detection, agile, and intelligent threat response for mitigating detected security threats.

1.1 Security Alert Engine

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types, distinct alert taxonomies, or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data, a security alert classification label, and/or an alert taxonomy.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert (e.g., security alert, prospective security alert, etc.). In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst, a user, etc.) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

2. Method for Configuring and Implementing Computer-Executable Detection Instructions in a Cybersecurity Threat Detection and Mitigation Platform As shown in FIG. 2, a method 200 for configuring and implementing computer-executable detection instructions in a cybersecurity threat detection and mitigation platform may include obtaining raw security events S210, transforming raw security events to technology source-agnostic security event signals S220, assessing technology source-agnostic security event signals S230, and routing service-validated security alerts S250. The method optionally includes generating automated detection decisioning workflows S240.

2.10 Obtaining Raw Security Event Data

S210, which includes obtaining raw security event data, may function to obtain raw security event data and/or raw security alert data from one or more third-party technology data sources associated with a subject subscriber. A third-party technology data source, as generally referred to herein, may relate to a cloud-based security device that may be configured to protect cloud-based infrastructure, applications, and/or data of a subject subscriber; a security information and event management (SIEM) security device that may function to collect and analyze event data occurring at or within a digital environment of the subject subscriber; and/or any other suitable technology device (or source) that may be capable of providing real-time monitoring of digital assets of the subject subscriber. It shall be recognized that the third-party technology data source may relate to different types of technology devices, security devices, and/or the like without departing from the scope of the disclosure.

In one or more embodiments, based on one or more third-party security devices (e.g., Okta™, Crowdstrike™, O365™, Palo Alto XDR™ or the like) of a subject subscriber being in operable communication with the cybersecurity event detection and response service, S210 may function to obtain, in real-time or near real-time, raw security events from each of the one or more third-party security devices. In such embodiments, the raw security events obtained by S210 may relate to third-party alerts, third-party events, event logs, raw events, raw alerts, security policy alerts, and/or activity occurring at, within, and/or involving internal computing networks or resources of the subject subscriber (e.g., one or more computing resources of the subject subscriber, one or more computing network resources of the subject subscriber, one or more cloud-based resources of the subject subscriber, any computer-accessible digital entity or device of the subject subscriber, and/or the like). It shall be recognized, in one or more embodiments, each distinct raw security event obtained by S210 may include a plurality of distinct pieces of event data (e.g., hostname data, IP address data, username data, domain data, etc.).

In a non-limiting example, S210 may function to receive a raw security event (that includes a plurality of distinct pieces of event data) from a cloud-based security device. For example, in one or more embodiments, S210 may function to receive a raw security event from a cloud-based security device (e.g., Google Cloud Platform®, Amazon Web Services®, etc.) that is hosting one or more cloud environments of a subject subscriber to the system 100 (e.g., cybersecurity event detection and response service).

Additionally, or alternatively, in such a non-limiting example, S210 may function to receive a raw security event (that includes a plurality of distinct pieces of event data) from a security information and event management (SIEM) security device. For example, in one or more embodiments, S210 may function to receive a raw security event (that includes a plurality of distinct pieces of event data) from a SIEM device (e.g., Sumo Logic Cloud SIEM®) of a subject subscriber to the system 100 (e.g., cybersecurity event detection and response service).

Additionally, or alternatively, in such a non-limiting example, S210 may function to receive a raw security alert (e.g., a vendor alert or the like) from a target third-party technology data source or third-party security device. For example, in one or more embodiments, S210 may function to receive a raw security alert from a target third-party security device or data source (e.g., Crowdstrike®, Elastic Security®, Duo®, 1Password®, etc.) of a subject subscriber to the system 100 (e.g., cybersecurity event detection and response service).

It shall be noted that, in one or more embodiments, S210 may function to periodically request or generate application programming interface (API) calls to one or more third-party technology data sources of a plurality of distinct third-party technology data sources that, in turn, provides raw event data (e.g., raw security events, logs, etc.) to a system or service implementing method 200. Additionally, or alternatively, S210 may function to receive automatic pushes of raw event data (e.g., raw security events, logs, etc.) from the one or more third-party technology data sources of the plurality of distinct third-party technology data sources. It shall be further noted, in one or more embodiments, internal user activity and/or external third-party activity occurring within a subscriber environment that may deviate from a subscriber security policy may cause a raw security event and/or raw security alert to be generated.

At least one technical advantage of obtaining raw security event data (e.g., raw security events, raw events, etc.) may enable the cybersecurity event detection and response service to assess, in real-time or near real-time, a likely cybersecurity threat of a subject raw security event that may involve a computing or digital asset of a subject subscriber, as described in more detail herein.

It shall be noted that "real-time" or "near real-time" as used herein may refer to output within strict time constraints. For example, in one or more embodiments, real-time output may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

2.20 Transforming Raw Security Events to Technology Source-Agnostic Security Event Signals S220, which includes transforming raw security events, may function to transform each raw security event obtained by S210 to a corresponding technology source-agnostic security event signal. A technology source-agnostic security event signal, as generally referred to herein, may be a transformed representation of a raw security event, obtained by S210, that is in a form understandable and/or processable by the cybersecurity event detection and response service irrespective of a third-party technology data source that identified the raw security event. It shall be recognized that the phrase "technology source-agnostic security event signal" may also be interchangeably referred to herein as a "normalized security event signal", an "event signal", a "system-standardized security event signal", and/or the like.

In one or more embodiments, S220 may function to automatically generate, via one or more processing devices, a technology source-agnostic security event signal based on a given raw security event or raw log data obtained from a third-party security device of a subscriber to the cybersecurity event detection and response service. In other words, a technology source-agnostic security event signal may be in any one of a plurality of standardized event signal schemas that enables the cybersecurity event detection and response service to automatically analyze and respond to raw security events across a diverse range of third-party security devices (e.g., third-party security events from third-party security devices) without needing to adapt computer-executable detection instructions to account for any of the third-party security devices within the diverse range of third-party security devices, as described in more detail herein.

In one or more embodiments, each distinct technology source-agnostic security event signal of a plurality of distinct technology source-agnostic security event signals may correspond to a distinct technology source-agnostic security event signal type. For instance, in a non-limiting example, a first technology source-agnostic security event signal may correspond to a first technology source-agnostic security event signal type, a second technology source-agnostic security event signal may correspond to a second technology source-agnostic security event signal type, a third technology source-agnostic security event signal may correspond to a third technology source-agnostic security event signal type, and n-number of technology source-agnostic security event signals may correspond to n-number of technology source-agnostic security event signal types, respectively. Stated another way, in one or more embodiments, a technology source-agnostic authentication event signal may correspond to a technology source-agnostic authentication event signal type, a technology source-agnostic phishing event signal may correspond to a technology source-agnostic phishing event signal type, a technology source-agnostic file event signal may correspond to a technology source-agnostic file event signal type, and a technology source-agnostic policy violation event signal may correspond to a technology source-agnostic policy violation event signal type.

Figure 3:
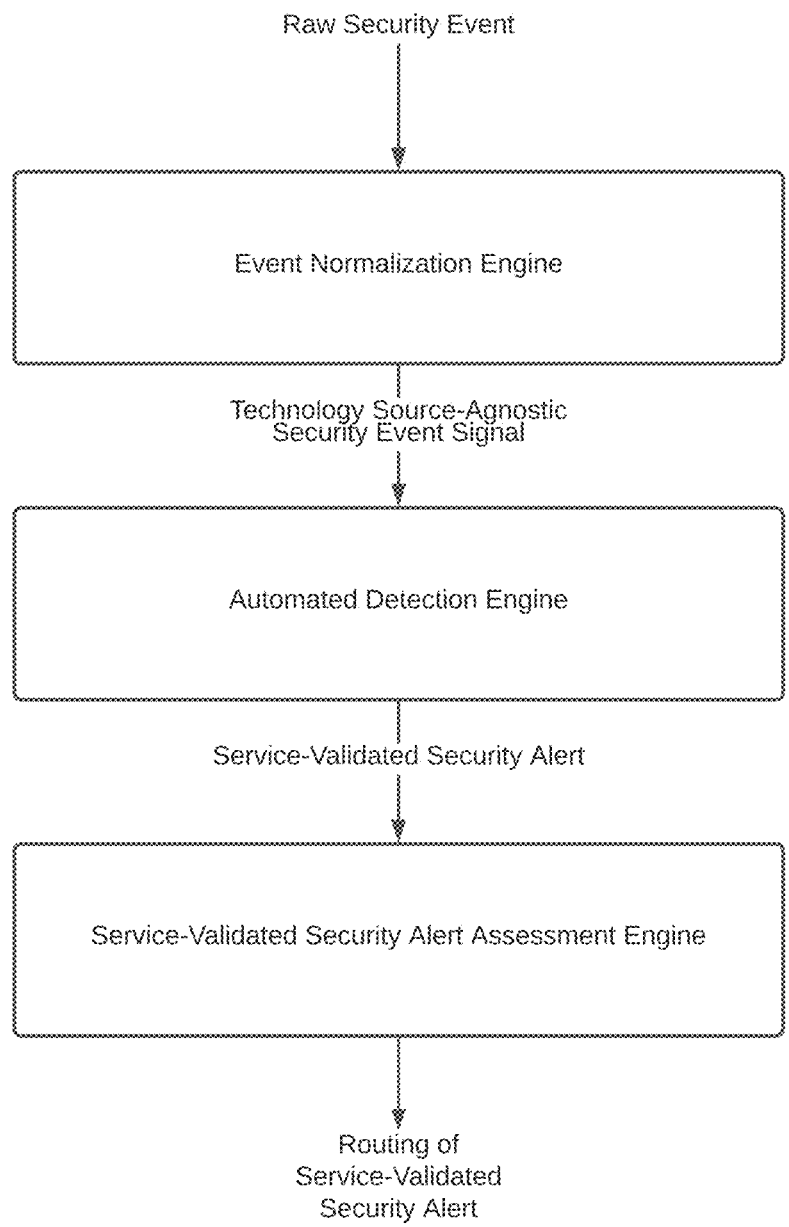
FIG. 3 illustrates an example schematic of a system or service implementing the example method 200 in accordance with one or more embodiments of the present application.
Figure 4:
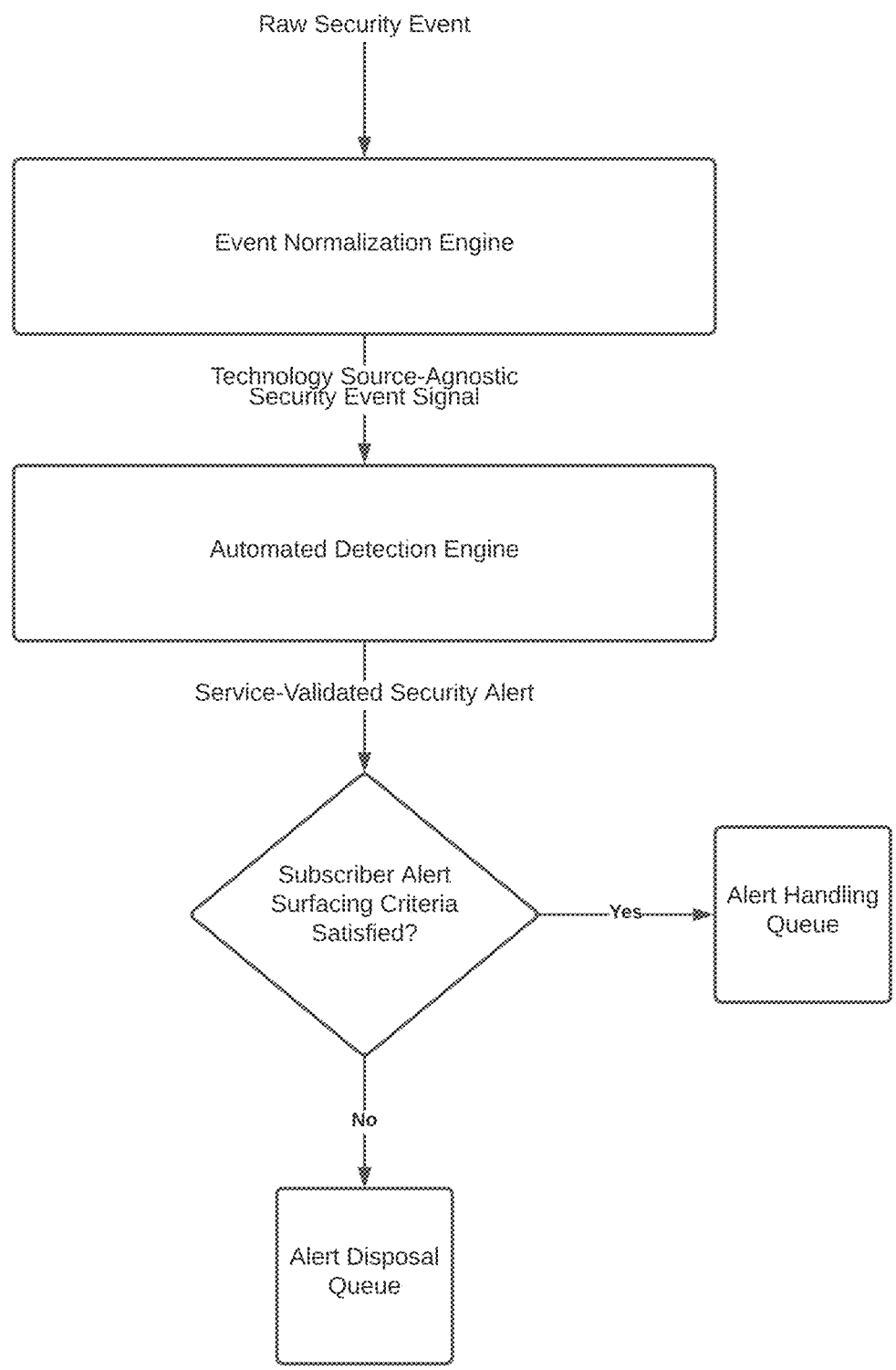
FIG. 4 illustrates an example schematic of routing a service-validated security alert in accordance with one or more embodiments of the present application.
Figure 8:
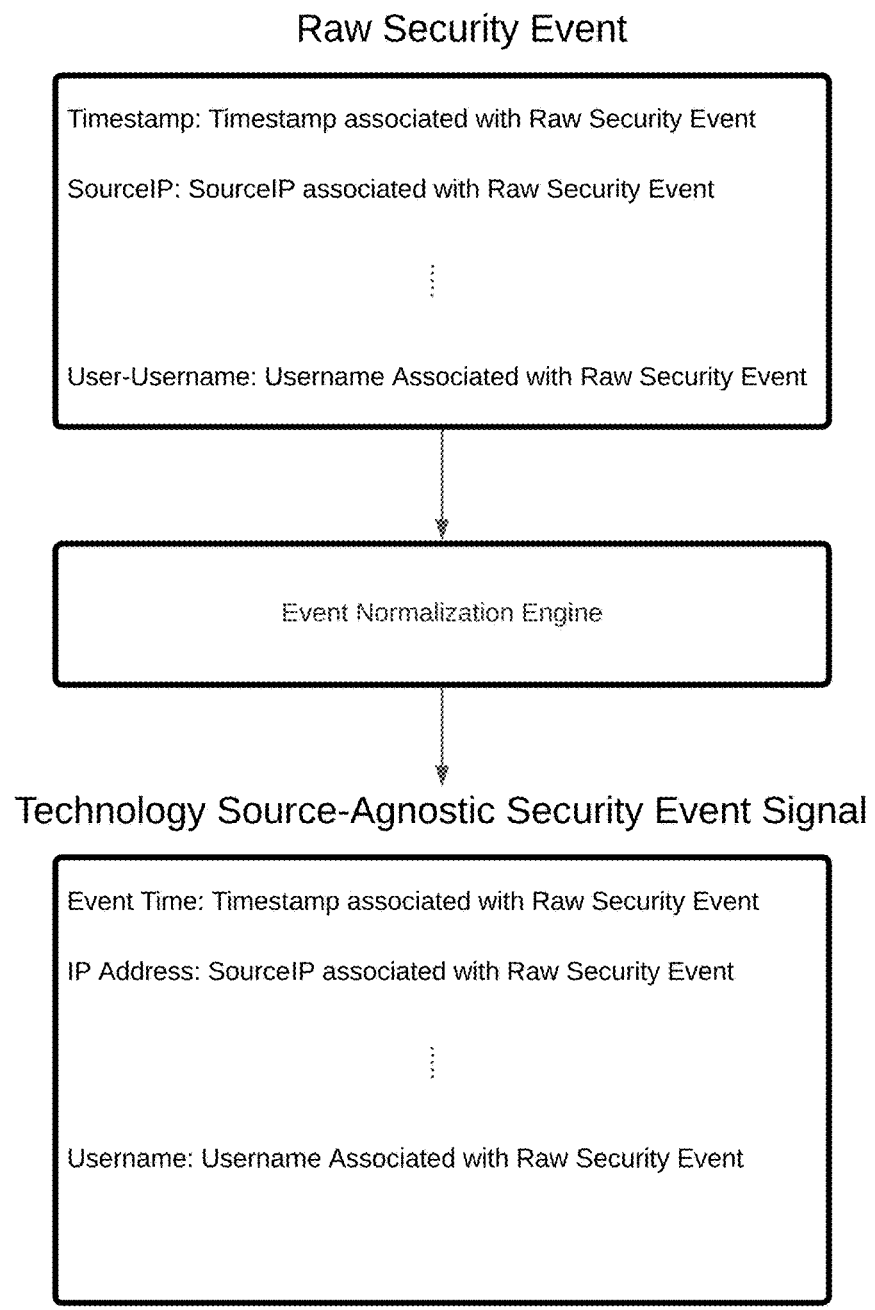
FIG. 8 illustrates an example of normalizing a raw security event to a technology source-agnostic security event signal in accordance with one or more embodiments of the present application.

In one or more embodiments, using an event normalization engine (e.g., an event normalization service or the like), S220 may function to automatically convert or transform, in real-time or near real-time, an inbound raw security event to a technology source-agnostic security event signal, as shown generally by way of example in FIG. 3, FIG. 4, and FIG. 8. Stated another way, each inbound raw security event may be processed through an event normalization layer that, in turn, transforms a subject raw security event into a corresponding technology source-agnostic security event signal, as described in U.S. Patent Application No. 63/555,853, titled SYSTEMS AND METHODS FOR AUTOMATICALLY CREATING NORMALIZED EVENTS IN A CYBERSECURITY THREAT DETECTION AND MITIGATION PLATFORM, which is incorporated in its entirety by this reference.

It shall be noted that, in one or more embodiments, S220 may function to normalize (e.g., convert, transform, and/or the like), a subject raw security event (of a third-party technology data source) to a technology source-agnostic security event based on a set of raw security event-to-technology source-agnostic security event signal instructions constructed for the third-party technology data source, as described in U.S. patent application Ser. No. 18/749,222, titled SYSTEMS, METHODS, AND GRAPHICAL USER INTERFACES FOR ACCELERATING A CONSTRUCTION OF A DATA INTEGRATION FOR A NON-INTEGRATED TECHNOLOGY DATA SOURCE, which is incorporated in its entirety by this reference.

For instance, in a non-limiting example, based on receiving a raw security event from a (first) third-party security device, S220 may function to assess and/or search, via one or more processors, an integration database that includes a corpus of raw security event-to-technology source-agnostic security event signal instructions using an identifier of the (first) third-party security device as a search parameter. In such a non-limiting example, based on the assessment or search, S220 may function to identify a set of raw security event-to-technology source-agnostic security event signal instructions that correspond to the (first) third-party security device. Accordingly, using the set of raw security event-to-technology source-agnostic security event signal instructions, S220 may function to normalize (e.g., convert, transform, etc.) the raw security event to a technology source-agnostic security event signal.

Additionally, or alternatively, in such a non-limiting example, based on receiving a raw security event from another third-party security device, S220 may function to assess and/or search an integration database that includes a corpus of raw security event-to-technology source-agnostic security event signal instructions using an identifier of the another third-party security device as a search parameter. In such a non-limiting example, based on the assessment or search, S220 may function to identify a set of raw security event-to-technology source-agnostic security event signal instructions that correspond to the another third-party security device. Accordingly, using the set of raw security event-to-technology source-agnostic security event signal instructions, S220 may function to normalize (e.g., convert, transform, etc.) the raw security event to a technology source-agnostic security event signal.

Stated another way, in one or more embodiments, based on S220 receiving a raw security event associated with a third-party technology data source, S220 may function to automatically process the raw security event in accordance with a data integration configured for the third-party technology data source and, in turn, generate one or more distinct technology source-agnostic security event signals based on the processing. Stated differently, in one or more embodiments, third-party security events from any third-party security vendor, third-party security device, or the like in communication with a system or service implementing method 200 may be transformed, generated, or converted into a corresponding technology-source agnostic security event signal of a corresponding type. This may enable the system or service implementing method 200 to respond to security threats in a standardized manner, regardless of the original source or format of a raw security event or the like.

It shall be recognized that, in one or more embodiments, a system or service implementing method 200 may have a plurality of predetermined or predefined technology source-agnostic event signal types including, but not limited to, a technology source-agnostic authentication-type signal, a technology source-agnostic file event-type signal, a technology source-agnostic multi factor authentication-type signal, a technology source-agnostic detection finding-type signal, a technology source-agnostic policy violation-type signal, a technology source-agnostic break glass event-type signal, a technology source-agnostic threat intel event-type signal, a technology source-agnostic vendor alert-type signal, a technology source-agnostic anomaly duet-type signal, a technology source-agnostic security finding-type signal, a technology source-agnostic email activity-type signal, a technology source-agnostic brute force-type signal, a technology source-agnostic network categorical threat-type signal, a technology source-agnostic blowhorn incident-type signal, a technology source-agnostic API activity-type signal, a technology source-agnostic web application firewall event-type signal, a technology source-agnostic phishing event-type signal, a technology source-agnostic SIEM event-type signal, a technology source-agnostic vendor event-type signal, a technology source-agnostic network connection-type signal, and a technology source-agnostic process event-type signal.

2.30 Assessing Technology Source-Agnostic Security Event Signals

S230, which includes assessing technology source-agnostic security event signals, may function to automatically assess, via one or more processing devices of the cybersecurity event detection and response service, each distinct technology source-agnostic security event signal generated by S220. In one or more embodiments, based on the automatic assessment of a subject technology source-agnostic security event signal, S230 may function to automatically determine if a prospective security alert, service-validated security alert or the like should be generated. It shall be noted that there are many technical benefits associated with assessing technology source-agnostic security event signals as will become more apparent throughout the remainder of this disclosure.

Figure 5:
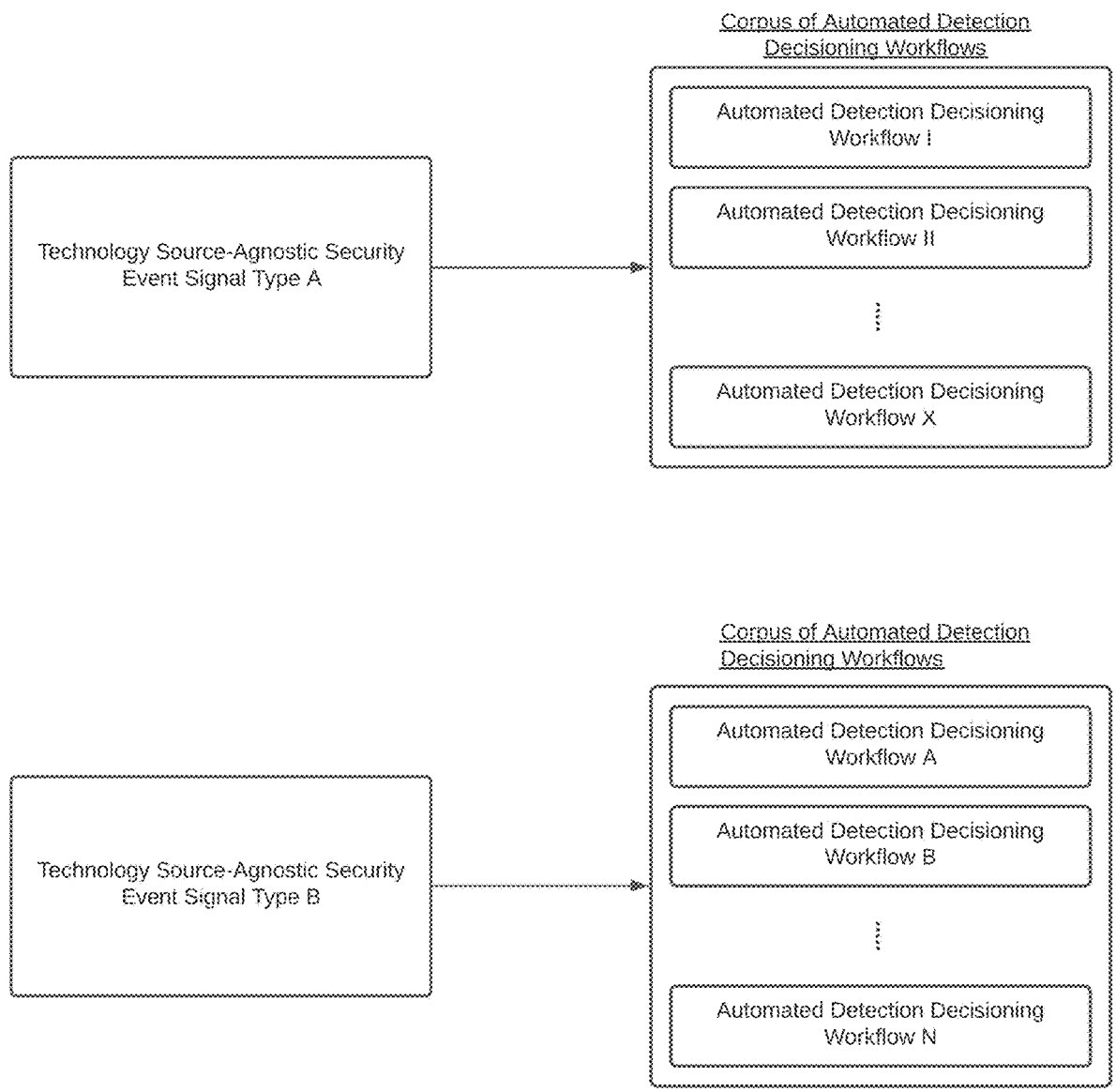
FIG. 5 illustrates an example representation of a digitally mapping between technology source-agnostic security event signal types and corpora of automated detection decisioning workflows in accordance with one or more embodiments of the present application.
Figure 19:
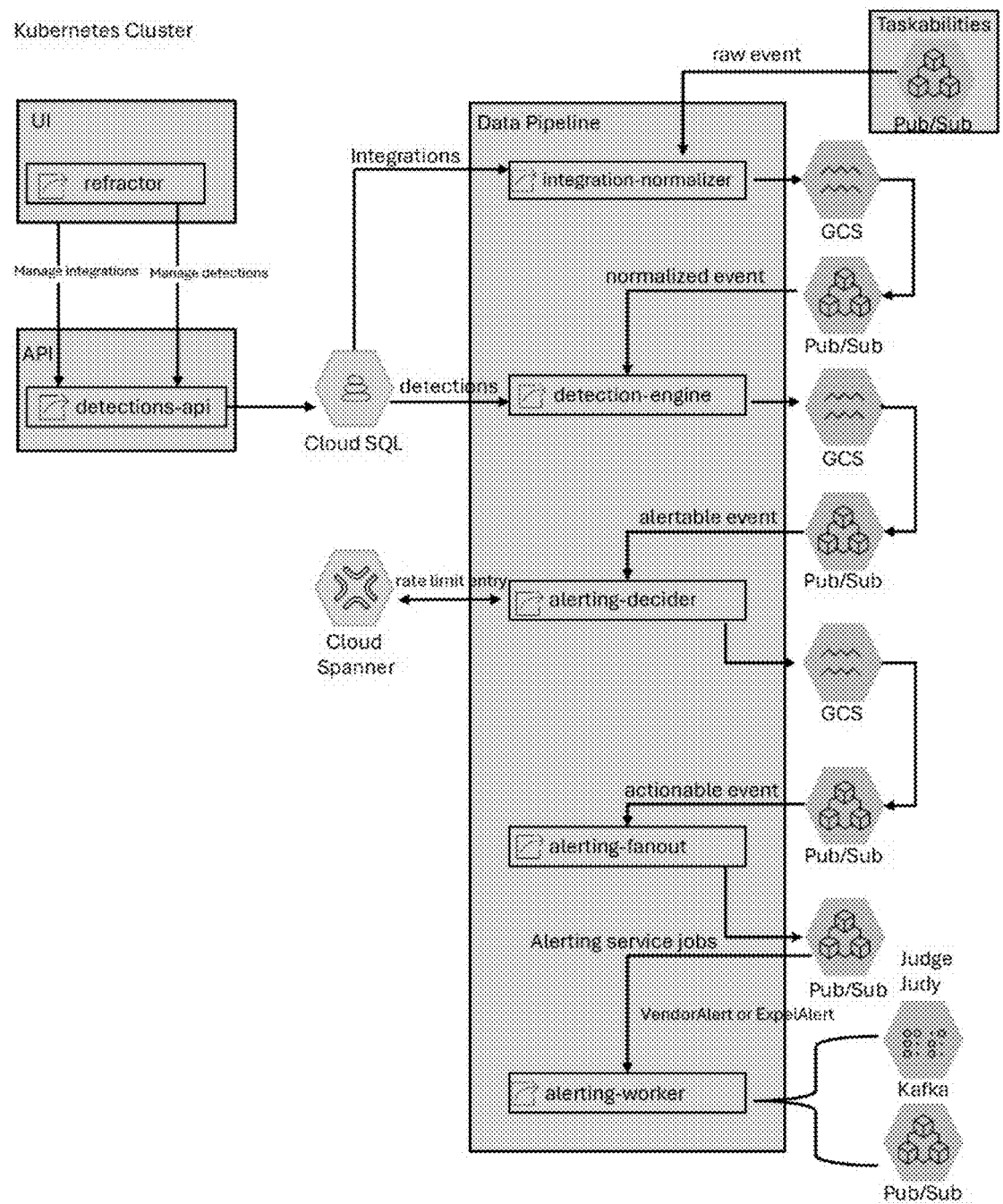
FIGS. 19-20 illustrate example schematics of a system or service implementing method 200 in accordance with one or more embodiments of the present application.
Figure 20:
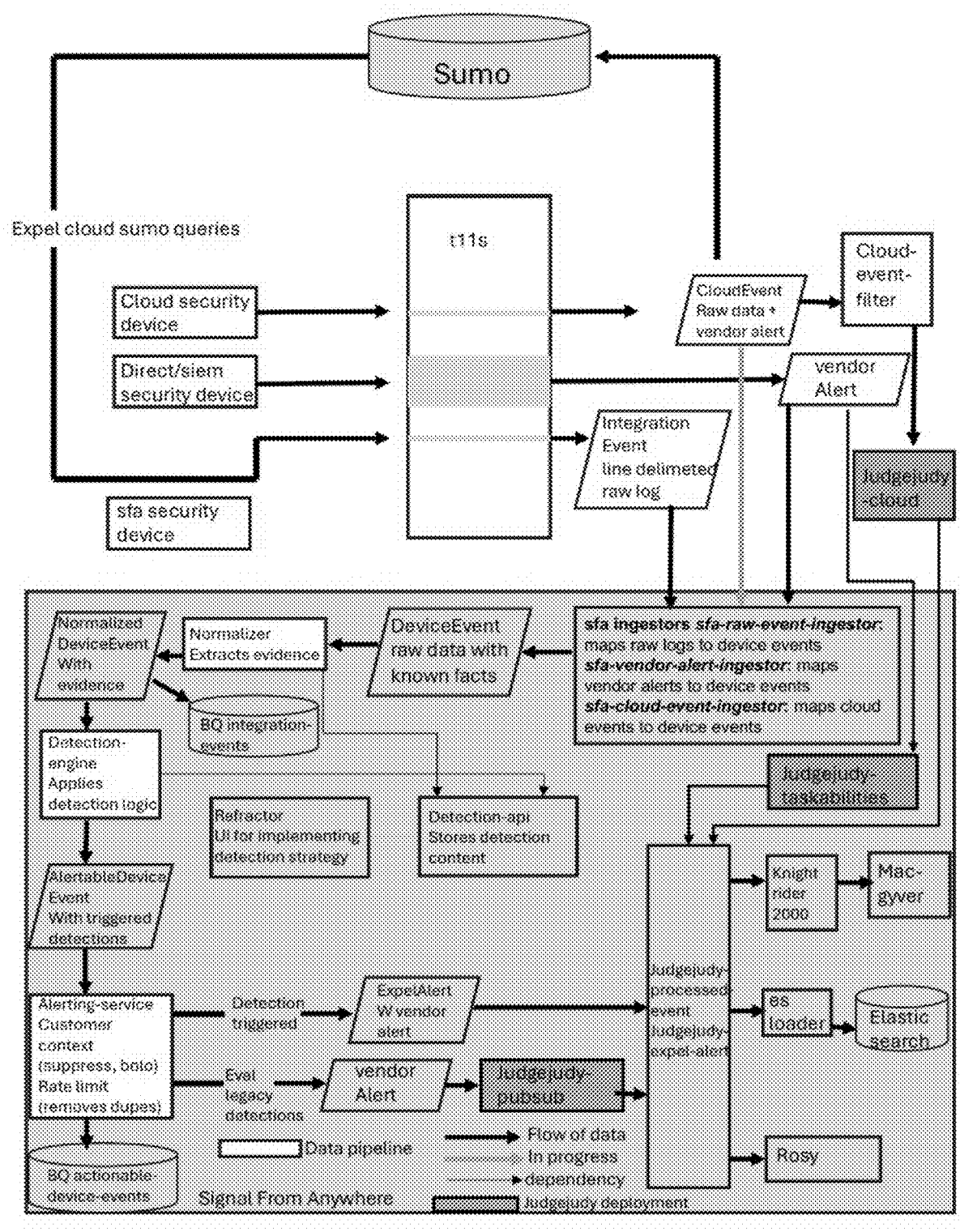

In one or more embodiments, each distinct technology source-agnostic security event signal type of the cybersecurity event detection and response service may be mapped to a distinct corpus of automated detection decisioning workflows (e.g., a distinct corpus of computer-executable detection instructions), as shown generally by way of example in FIG. 5. Stated another way, a plurality of distinct corpora of automated detection decisioning workflows (e.g., a plurality of distinct corpora of computer-executable detection instructions) may be mapped to a plurality of distinct technology source-agnostic security event signal types, respectively. In this way, event response logic (e.g., detection rules, computer-executable detection heuristics, detection instructions, threat response instructions, and/or the like) may be digitally mapped to technology source-agnostic security event signals rather than third-party technology data sources. Therefore, at least one technical benefit of implementing such mapping may enable the cybersecurity event detection and response service to apply a detection layer over technology source-agnostic security event signals rather than raw security alert/event data received from third-party data sources (e.g., third-party security devices, etc.), as shown generally by way of example in FIG. 19 and FIG. 20. Thereby, preventing detection logic (e.g., detection rules, computer-executable detection heuristics, automated detection decisioning workflows and/or the like) being constructed for each distinct third-party technology data source to which the cybersecurity event detection and response service integrates therewith.

That is, in one or more embodiments, each unique type of technology-independent security event signal (e.g., technology source-agnostic security event signal) may be digitally linked to a unique set of automated detection workflows (e.g., computer-executable detection instructions), allowing the system or service implementing method 200 to apply detection logic (e.g., detection rules, computer-executable detection heuristics, detection instructions, and/or the like) to technology-independent security event signals instead of raw event data from third-party sources, thereby avoiding the need to create detection logic for each separate third-party data source. In other words, the cybersecurity event detection and response service does not need to develop and deploy separate detection logic for each individual third-party data source, but rather may define computer-executable detection instructions per each type of technology source-agnostic security event signal.

Stated another way, in one or more embodiments, each distinct technology source-agnostic security event signal type of the cybersecurity event detection and response service may be digitally coupled to a distinct corpus of computer-executable detection instructions. Each distinct corpus of computer-executable detection instructions, in one or more embodiments, may include a plurality of computer-executable detections instructions (e.g., heuristics-based computer-executable detection instructions, machine learning-based computer-executable detection instructions that use one or more machine learning models, etc.) that may be configured to assess technology source-agnostic security event signals of a target type. In other words, a corpus of computer-executable detection instructions digitally coupled or mapped to a first technology source-agnostic security event signal type (e.g., authentication-type signal) may only include computer-executable detection instructions that are configured to evaluate subject technology source-agnostic security event signals of the first technology source-agnostic security event signal type (e.g., authentication-type signal), a corpus of computer-executable detection instructions digitally coupled or mapped to a second technology source-agnostic security event signal type (e.g., phishing-type signal) may only include computer-executable detection instructions that are configured to evaluate subject technology source-agnostic security event signals of the second technology source-agnostic security event signal type (e.g., phishing-type signal), and so forth for each technology source-agnostic security event signal type defined by the system or service implementing method 200. As a result, in one or more embodiments, the system or service implementing method 200 may maintain a higher level of adaptability and responsiveness, providing targeted defenses against diverse threats, regardless of the originating technology source. It shall be further recognized, in one or more embodiments, a machine learning-based detection instruction may use one or more machine learning models, often reducing false positives in alerting, while heuristic-based detection instructions may be quicker to implement.

Figure 6:

Additionally, or alternatively, in one or more embodiments, a first type of automated detection decisioning workflow (e.g., an authentication from a suspicious IP workflow, a first computer-executable detection instruction, etc.) may be digitally linked to a technology source-agnostic authentication event signal type, a second type of automated detection decisioning workflow (e.g., a failed or rejected multi-factor authentication request workflow, a second computer-executable detection instruction, etc.) may be digitally linked to the technology source-agnostic authentication event signal type, a third type of automated detection decisioning workflow (e.g., authentication from a suspicious user-agent workflow, a third computer-executable detection instruction, etc.) may be digitally linked to the technology source-agnostic authentication event signal type, and/or any suitable number of automated detection decisioning workflows may be digitally linked to the technology source-agnostic authentication event signal type, as shown generally by way of example in FIG. 5, FIG. 6, and FIG. 10. Stated another way, each of the plurality of automated detection decisioning workflows (e.g., computer-executable detection instructions, etc.) digitally mapped to the technology source-agnostic authentication event signal type may be specifically configured to process and/or evaluate a likely threat of inbound technology source-agnostic security event signals of the technology source-agnostic authentication event signal type.

Additionally, or alternatively, in such a non-limiting example, a fourth type of automated detection decisioning workflow (e.g., a critical severity vendor alert workflow) may be digitally linked to a technology source-agnostic vendor alert signal type, a fifth type of automated detection decisioning workflow may be digitally linked to the technology source-agnostic vendor alert signal type, etc. That is, each of the plurality of automated detection decisioning workflows digitally mapped to the technology source-agnostic vendor alert signal type may be specifically configured to process and/or evaluate technology source-agnostic security event signals of the technology source-agnostic vendor alert signal type.

Figure 7C:

In one or more embodiments, each automated detection decisioning workflow may define alerting conditions (e.g., service-defined alerting criteria, etc.) for which a service-validated security alert (e.g., prospective security alert or the like) may be generated, as shown generally by way of example in FIG. 7A-7C. In one or more embodiments, a service-validated security alert (e.g., prospective security alert or the like) may be generated when the cybersecurity event detection and response service determines that a subject technology source-agnostic security event signal appears malicious, requires further investigation, and/or appears suspicious.

For instance, in a non-limiting example, an automated detection decisioning workflow (e.g., an authentication from a suspicious IP) digitally linked to the technology source-agnostic authentication event signal type may include computer-executable instructions that may cause a creation of a service-validated security alert (e.g., prospective security alert or the like) when a subject technology source-agnostic security event signal of the technology source-agnostic authentication event signal type has a source internet protocol (IP) address that matches one of a plurality of suspicious (IP) addresses included in a corpus of suspicious (IP) addresses.

Additionally, or alternatively, in such a non-limiting example, a subject automated detection decisioning workflow digitally linked to the technology source-agnostic vendor alert signal type may include computer-executable instructions that may cause a creation of a service-validated security alert when a subject technology source-agnostic security event signal of the technology source-agnostic vendor alert signal type satisfies alerting conditions (e.g., service-defined alerting criteria, etc.) defined by the subject automated detection decisioning workflow.

It shall be noted that, in one or more embodiments, each technology source-agnostic vendor alert signal, when generated, by the cybersecurity event detection and response service may be assigned a corresponding threat severity level (e.g., low threat severity, medium threat severity, high threat severity, critical threat severity, and/or the like) and/or tagged with a service-specific label (e.g., suspicious authentication) and MITRE label (e.g., TA0001—Initial Access), as described in more detail herein.

It shall be recognized that, in one or more embodiments, the total number of computer-executable detection instructions may vary from one corpus of computer-executable detection instructions to another corpus of computer-executable detection instructions. For example, in some embodiments, a first corpus of computer-executable detection instructions digitally mapped or coupled to a first technology source-agnostic security event signal type may include a first plurality of computer-executable detection instructions, and a second corpus of computer-executable detection instructions digitally mapped to a second technology source-agnostic security event signal type may include a second plurality of computer-executable detection instructions. In such embodiments, a total number of computer-executable detection instructions included in the first corpus of computer-executable detection instructions may be different from a total number of computer-executable detection instructions included in the second corpus of computer-executable detection instructions.

It shall be further recognized that, in some embodiments, the same computer-executable detection instruction may be present or occur in more than one corpus of computer-executable detection instructions. For instance, with reference to the above non-limiting example, the same computer-executable detection instruction may be in both the first corpus of computer-executable detection instructions and the second corpus of computer-executable detection instructions. In such a non-limiting example, the computer-executable detection instruction (e.g., the same computer-executable detection instruction) may be configured to generate a prospective security alert of a first distinct type when a subject technology source-agnostic security event signal satisfies a first distinct set of alerting conditions of the computer-executable detection instruction and a prospective security alert of a second distinct type when a subject technology source-agnostic security event signal satisfies a second distinct set of alerting conditions of the computer-executable detection instruction.

It shall be further recognized that, in one or more embodiments, each distinct computer-executable detection instruction of a subject corpus of computer-executable detection instructions digitally mapped to a target technology source-agnostic security event signal type may be configured to assess inbound technology source-agnostic security event signals of the target technology source-agnostic security event signal type against a distinct set of alerting conditions. Furthermore, in such embodiments, each distinct computer-executable detection instruction of the subject corpus of computer-executable detection instructions may be configured to generate a corresponding prospective security alert based on satisfying the distinct set of alerting conditions associated with that distinct computer-executable detection instruction.

For instance, in a non-limiting example, the subject corpus of computer-executable detection instructions digitally mapped or linked to the target technology source-agnostic security event signal type may include a first computer-executable detection instruction that may be configured to automatically generate a first type of prospective security alert based on a technology source-agnostic security event signal satisfying the distinct set of predefined alerting conditions of the first computer-executable detection instruction. Additionally, or alternatively, in such a non-limiting example, the subject corpus of computer-executable detection instructions digitally mapped or linked to the target technology source-agnostic security event signal type may include a second computer-executable detection instruction that may be configured to automatically generate a second type of prospective security alert based on the technology source-agnostic security event signal satisfying the distinct set of predefined alerting conditions of the second computer-executable detection instruction. Additionally, or alternatively, in such a non-limiting example, the subject corpus of computer-executable detection instructions digitally mapped or linked to the target technology source-agnostic security event signal type may include a third computer-executable detection instruction that may be configured to automatically generate a third type of prospective security alert based on the technology source-agnostic security event signal satisfying the distinct set of predefined alerting conditions of the third computer-executable detection instruction. It shall be recognized that, in some embodiments, the first type of prospective security alert, the second type of prospective security alert, and third type of prospective security alert may each correspond to a distinct type of prospective security alert.

In one or more embodiments, in response to a system or service generating a technology source-agnostic security event signal based on a raw event associated with a third-party security service, the system or service may function to identify a technology source-agnostic security event signal type that corresponds to the technology source-agnostic security event signal. Accordingly, in such embodiments, the system or service may function to automatically retrieve, via one or more processors, a corpus of computer-executable detection instructions (or a representation of the corpus of computer-executable detection instructions) digitally linked to the technology source-agnostic security event signal type based on querying a detection instructions database storing each computer-executable detection instruction of the system or service. For instance, in a non-limiting example, the system or service may function to automatically construct an API call that includes the technology source-agnostic security event signal type as a search parameter and, in turn, receive all computer-executable detection instructions digitally linked or mapped to the technology source-agnostic security event signal type (e.g., the corpus of computer-executable detection instructions digitally linked to the technology source-agnostic security event signal type) based on executing the API call.

Accordingly, in one or more embodiments, after retrieving the computer-executable detection instructions digitally linked or mapped to the technology source-agnostic security event signal type, the system or service implementing method 200 may function to assess the technology source-agnostic security event signal against each computer-executable detection instructions of the retrieved computer-executable detection instructions. Based on the number of computer-executable detection instructions satisfied (e.g., satisfying the alerting conditions specified by the computer-executable detection instructions), the system or service may function to generate one or more distinct prospective security alerts (e.g., one prospective security alert, two distinct prospective security alerts, etc.). In other words, if alerting conditions of two distinct computer-executable detection instructions of the retrieved computer-executable detection instructions are satisfied, the system or service implementing method 200 may function to generate two distinct prospective security alerts, respectively.

It shall be recognized that, in one or more embodiments, S230 may function to automatically assess, via one or more processors, a likely threat of a subject technology source-agnostic security event signal of a first distinct technology source-agnostic security event signal type using a corpus of computer-executable detection instructions digitally mapped to the first distinct technology source-agnostic security event signal type. Additionally, or alternatively, in such an embodiment, S230 may function to automatically assess, via one or more processors, a likely threat of a subject technology source-agnostic security event signal of a second distinct technology source-agnostic security event signal type using a corpus of computer-executable detection instructions digitally mapped to the second distinct technology source-agnostic security event signal type.

2.40 Generating Automated Detection Decisioning Workflows

Optionally, S240, which includes generating automated detection decisioning workflows, may function to instantiate a detection-building graphical user interface that may provide a capability of configuring and/or building one or more automated detection decisioning workflows (e.g., computer-executable detection instructions or the like). In one or more embodiments, based on or in response to instantiating the detection-building graphical user interface, a target user may use the detection-building graphical user interface to configure (e.g., construct and simulate) an automated detection decisioning workflow and digitally map the automated detection decisioning workflow (e.g., computer-executable detection instruction or the like) to one or more target technology source-agnostic security event signal types (e.g., one target technology source-agnostic security event signal type, two technology source-agnostic security event signal types, three technology source-agnostic security event signal types, etc.) of the plurality of distinct technology source-agnostic security event signal types of the cybersecurity event detection and response service. It shall be noted that, in one or more embodiments, each automated detection decisioning workflow generated by S240 may be digitally linked, mapped, and/or associated with one or more of a plurality of technology source-agnostic security event signal types (e.g., one technology source-agnostic security event signal type, two technology source-agnostic security event signal types, three technology source-agnostic security event signal types, or any other suitable number of technology source-agnostic security event signal types).

In one or more embodiments, a layout or arrangement of the detection-building graphical user interface may enable a target user, who may have limited-to-no experience in constructing automated detection decisioning workflows, to intuitively construct one or more automated detection decisioning workflows that may underpin a subject technology source-agnostic security event signal type. Stated another way, users may build automated detection decisioning workflows through a graphical user interface without writing any code (e.g., no-code, instead using visual tools and pre-built components, etc.), as shown generally by way of examples in FIGS. 11-18.

In one or more embodiments, a system or service implementing method 200 may function to instantiate, via one or more processors, a detection-building graphical user interface for constructing a target automated detection instruction based on receiving a request from a user. The request from the user, in one or more embodiments, may be received based on (or in response to) a user selecting a user interface object that, when selected, instantiates the detection-building graphical user interface that may enable the user to build, design, construct, and/or the like a new computer-executable detection instruction.

Overview Region

In one or more embodiments, based on or in response to instantiating the detection-building graphical user interface, the detection-building graphical user interface may function to display an overview region. The overview region of the detection-building graphical user interface may be used, in part, to construct at least a portion of a target automated detection decisioning workflow (e.g., computer-executable detection instruction), as shown generally by way of example in FIG. 7A. The overview region, in one or more embodiments, may include one or more user interface elements that may provide a target user a capability of defining precursory data associated with a target automated detection decisioning workflow (e.g., name of automated detection decisioning workflow, description of automated detection decisioning workflow, etc.).

Additionally, or alternatively, in one or more embodiments, the overview region may include one or more selectable user interface objects that controls whether the target automated detection decisioning workflow, when deployed into a production environment of the cybersecurity event detection and response service, is implemented for only a target subscriber (e.g., Subscriber "A" or Subscriber "B") or is implemented for all subscribers to the cybersecurity event detection and response service, as shown generally by way of example in FIG. 7A.

Additionally, or alternatively, in one or more embodiments, the overview region may include an event/alert taxonomy data field that may be configured to receive event/alert taxonomy data (e.g., Suspicious Authentication) that may cause an execution of additional automated detection decisioning workflows (e.g., suspicious authentication automated detection decisioning workflows) digitally mapped to the event/alert taxonomy (e.g., Suspicious Authentication) when the target automated detection decisioning workflow is executed.

Stated another way, in one or more embodiments, the overview region of the detection-building graphical user interface may include a plurality of detection-identifying user interface input elements that may be configured to receive, from a user, one or more strings of text that characterize a target computer-executable detection instruction (e.g., a computer-executable detection instruction being built by a user, an automated detection instruction being built by the user, etc.). For example, in one or more embodiments, the overview region of the detection-building graphical user interface may include a detection name data field that may be configured to receive, as input, one or more text strings that may indicate a name of the target computer-executable detection instruction (e.g., authentication from a suspicious IP).

Additionally, or alternatively, in one or more embodiments, the overview region of the detection-building graphical user interface may include a detection description data field that may be configured to receive, as input, one or more text strings that may indicate a description of the target computer-executable detection instruction (e.g., a successful authentication was observed with a suspicious IP).

Additionally, or alternatively, in one or more embodiments, the overview region of the detection-building graphical user interface may include a set of user interface buttons, that when operated, is configured to control whether the target computer-executable detection instruction is used or implemented for only a target subscriber or across all subscribers subscribing to a cybersecurity event detection and response service. For instance, in such an embodiment, when a system or service receives, from the user, a selection of the "all organizations" button, a system or service may deploy the target computer-executable detection instruction for all organizations or subscribers of the system or service. Alternatively, in such an embodiment, when a system or service receives, from the user, a selection of the "one organization" button, a system or service may deploy the target computer-executable detection instruction for a target organization or subscriber based on receiving the selection that indicates which organization or subscriber for which the target computer-executable detection instruction should be implemented.

Additionally, or alternatively, in one or more embodiments, the overview region of the detection-building graphical user interface may include an automated investigations control button that, when selected, is configured to display a drop-down menu element of a plurality of predetermined alert taxonomies. In such an embodiment, the system or service may function to receive a selection of the automated investigations control button and, in turn, display the drop-down menu element of the plurality of alert taxonomies. Accordingly, the system or service may function to receive, from a user, a selection of one of the plurality of alert taxonomies displayed in the drop-down menu element and, in turn, the target automated detection instruction is configured to execute a set of automated investigation workflows digitally mapped to the one of the plurality of alert taxonomies based on receiving the selection of the one of the plurality of alert taxonomies. Each automated investigation workflow may be configured to automatically investigate a subject technology source-agnostic security event signal, as described in U.S. patent application Ser. No. 17/488,800, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, which is incorporated in its entirety by this reference. In other words, the target automated detection instruction, when executed, may function to execute a plurality of distinct automated investigation workflows that automatically gather and/or fetch data related to the subject technology source-agnostic security event signal from a plurality of external and/or internal data sources of the cybersecurity event detection and response service and, in turn, analyze the data.

Automated Detection Testing/Simulation Region

In one or more embodiments, based on or in response to instantiating the detection-building graphical user interface, the detection-building graphical user interface may function to display an automated detection testing/simulation region. The automated detection testing/simulation region of the detection-building graphical user interface may be used, in part, to test or simulate the target computer-executable detection instruction. The automated detection testing/simulation region, in one or more embodiments, may include one or more user interface elements that may provide a target user a capability of defining a test or a simulation for the target computer-executable detection instruction.

In one or more embodiments, S240 may function to instantiate, via the detection-building graphical user interface, a detection instructions simulation container based on receiving an input, from a user, selecting a detection simulation addition control button of the detection-building graphical user interface. In such embodiments, the detection instruction simulation container may be configured to receive, from the user, input of a sample raw event generated by a target third-party security service or a third-party security application for validating that the target automated detection instruction (e.g., target computer-executable detection instruction or the like) is executed and/or executed correctly in response to normalizing the sample raw event and/or providing the normalized sample raw event to the target automated detection instruction (and/or a detections instructions engine). It shall be noted that, in one or more embodiments, the simulation or test of the target automated detection instruction may be automatically performed in response to receiving the sample raw event.

Additionally, or alternatively, in one or more embodiments, the detection-building graphical user interface may include a distinct simulation outcome user interface indicator that corresponds to the detection instructions simulation container. In such a non-limiting example, the distinct simulation outcome user interface indicator may be of a first color (e.g., green) when the target automated detection instruction was successfully executed (e.g., triggered, etc.) and/or responded as expected (e.g., generated a prospective security alert for the sample raw event based on the corresponding technology source-agnostic security event signal satisfying the corresponding alerting conditions, etc.). In one or more embodiments, the distinct simulation outcome user interface indicator may be of a second color (e.g., red) different from the first color (e.g., green) when the target automated detection instruction was not successfully executed (e.g., not triggered, etc.) nor behaved as expected (e.g., did not generate a prospective security alert for the sample raw event).

Stated another way, in one or more embodiments, the detection instructions simulation container may function to receive, as input, one or more raw events (e.g., a plurality of distinct raw events, etc.) that should cause an execution or trigger of the target computer-executable detection instruction. Accordingly, in one or more embodiments, based on (or in response to) obtaining the one or more raw events, a system or service may function to simulate or test whether each of the one or more raw events actually triggered (or caused an execution) of the target automated detection instruction (e.g., target computer-executable detection instruction or the like).

In one or more embodiments, the automated detection testing/simulation region may be configured to provide users the ability to ensure the target computer-executable detection instruction, or the like is working correctly before implementing the target computer-executable detection instruction into production or operation. For example, users can simulate various security scenarios by inputting different raw events to test whether the detection instruction triggers appropriate alerts or actions. This pre-deployment validation may help in identifying any issues or misconfigurations in the detection instruction, ensuring it performs as intended when integrated into a live environment. By thoroughly testing the instruction in the simulation environment, users can reduce the risk of undetected threats or false positives when the target computer-executable detection instruction is operational (e.g., live).

Automated Detection Decisioning Execution Criteria Region

In one or more embodiments, based on or in response to instantiating the detection-building graphical user interface, the detection-building graphical user interface may function to display an automated detection decisioning execution criteria region. The automated detection decisioning execution criteria region of the detection-building graphical user interface may be used, in part, to construct at least a portion of a target automated detection decisioning workflow, as shown generally by way of example in FIG. 7B. The automated detection decisioning execution criteria region, in one or more embodiments, may include one or more user interface elements that may provide a target user a capability of defining one or more execution parameters, that when satisfied, causes an execution (or trigger) of the target automated detection decisioning workflow.

In one or more embodiments, based on receiving one or more user inputs, the automated detection decisioning execution criteria region may digitally map or digitally associate one or more distinct technology source-agnostic security event signal types (e.g., technology source-agnostic authentication event signal) to a target automated detection decisioning workflow. For instance, in a non-limiting example, when S220 generates a technology source-agnostic event signal corresponding to one of the one or more distinct technology source-agnostic security event signal types, each automated detection decisioning workflow having execution criteria that includes the one of the one or more distinct technology source-agnostic security event signal types may be automatically executed.

Additionally, in some embodiments, based on receiving one or more user inputs, a set of alerting conditions may be defined for a subject automated detection decisioning workflow. It shall be noted that, in such embodiments, a subject technology source-agnostic event signal may need to satisfy each alert condition (e.g., alert condition A, alert condition B) of the set of alerting conditions prior to the subject automated detection decisioning workflow generating a service-validated security alert.

Stated another way, in one or more embodiments, S240 may function to instantiate, via the detection-building graphical user interface, a detection instruction execution container based on receiving an input, from the user, selecting a detection instruction execution control button of the detection-building graphical user interface. The detection instruction execution container, in one or more embodiments, may include a signal type user interface element that, when selected, displays a drop-down menu element of a plurality of technology source-agnostic event signal types provided by the system or service implementing method 200 and/or one or more condition-setting user interface elements being configured to receive inputs of characters that define one or more alert generation conditions that must be satisfied prior to a generation of a subject prospective security alert using the target automated detection instruction (e.g., target computer-executable detection instruction or the like).

For instance, in a non-limiting example, the system or service implementing method 200 may function to receive, from a user, a selection of the detection instruction execution control button of the detection-building graphical user interface and, in turn, instantiate a detection instruction execution container. In such a non-limiting example, the system or service may function to receive, from the user, a selection of the signal type user interface element and, in turn, display the drop-down menu element of a plurality of technology source-agnostic event signal types. Accordingly, in such a non-limiting example, the system or service may function to receive, from the user, a selection of a first technology source-agnostic event signal type (e.g., a technology source-agnostic event "Api Activity" signal type) from the plurality of technology source-agnostic event signal types. It shall be recognized that, in one or more embodiments, after receiving the selection of the first technology source-agnostic event signal type (e.g., a technology source-agnostic event "Api Activity" signal type), the target automated detection instruction (e.g., target computer-executable detection instruction or the like) may be configured to trigger or cause an execution of the target automated detection instruction for subject technology-source agnostic security event signals of only the first technology source-agnostic event signal type (e.g., a technology source-agnostic event "Api Activity" signal type).

Furthermore, in one or more embodiments, the detection instruction execution container may provide the user with the capability to define further specific conditions or parameters associated with the selected signal type (e.g., a technology source-agnostic event "Api Activity" signal type).

For example, in one or more embodiments, based on receiving, from the user, a selection of an "add condition" control button, a set of condition-setting user interface input elements may be instantiated. In such a non-limiting example, the set of condition-setting user interface input elements may allow the user to define further specific conditions and criteria that must be satisfied prior to a triggering or an execution of the target automated detection instruction (e.g., target computer-executable detection instruction or the like).

Accordingly, with reference to the above non-limiting example, if the user wants the target automated detection instruction (e.g., target computer-executable detection instruction or the like) to only execute or trigger on technology source-agnostic security event signals of the first technology source-agnostic event signal type (e.g., a technology source-agnostic event "Api Activity" signal type) when the technology source-agnostic security event signals have an application programming interface (API) response error of access denied, the system or service may receive, from the user, specific inputs into the set of condition-setting user interface input elements defining such conditions.

Accordingly, with reference to the above non-limiting example, if the user further wants the target automated detection instruction (e.g., target computer-executable detection instruction or the like) to only execute or trigger on technology source-agnostic security event signals of the first technology source-agnostic event signal type (e.g., a technology source-agnostic event "Api Activity" signal type) when the technology source-agnostic security event signals have an application programming interface (API) response error of access denied and have a source endpoint domain of ".amazonaws.com", the system or service may receive, from the user, specific inputs into an additional set of condition-setting user interface input elements defining such conditions. The additional set of condition-setting user interface input elements may be instantiated based on receiving, from the user, an additional selection of an "add condition" control button.

It shall be noted that, in one or more embodiments, a user may function to define an execution condition based on subscriber-specific features or attributes. For instance, in a non-limiting example, if the user wants to define an execution condition that specifies executing a target computer-executable detection instruction when there is an authentication attempt from countries where the subject subscriber does not operate, the detection instruction may be configured to access the relevant dataset (of the subject subscriber) containing this information and receive specific inputs from the user into a set of condition-setting user interface input elements defining such conditions. This allows the system to tailor detection instructions to the unique operating characteristics of a subscriber.

It shall be further noted that, in one or more embodiments, the user may define more, different, or fewer conditions without departing from the scope of the disclosure such as count-based conditions, Boolean conditions, time-based conditions, or any other suitable condition.

Automated Detection Decisioning Response Region

In one or more embodiments, based on or in response to instantiating the detection-building graphical user interface, the detection-building graphical user interface may function to display an automated detection decisioning response region. The automated detection decisioning response region of the detection-building graphical user interface may be used, in part, to construct at least a portion of a target automated detection decisioning workflow, as shown generally by way of example in FIG. 7C. The automated detection decisioning response region, in one or more embodiments, may include one or more user interface elements that may provide a target user a capability of defining response criteria of the target automated detection decisioning workflow when each of the alerting conditions of the target automated detection decisioning workflow is satisfied.

For instance, in a non-limiting example, based on a subject technology-source agnostic event signal satisfying alerting conditions of a subject automated detection decisioning workflow, the subject automated detection decisioning workflow may generate a service-validated security alert (e.g., prospective security alert or the like). Stated another way, in one or more embodiments, based on receiving one or more user inputs at the automated detection decisioning response region, the response criteria of the subject automated detection decisioning workflow may provide instructions for generating a service-validated security alert having an alert name (e.g., suspicious authentication activity), an alert threat severity (e.g., low threat severity), a MITRE Tactic category (e.g., TA0001—Initial Access), and a service-specific alert category (e.g., suspicious authentication) when alerting conditions of the subject automated detection decisioning workflow is satisfied.

Accordingly, in such embodiments, based on the subject technology-source agnostic event signal satisfying one or more alerting conditions of the subject automated detection decisioning workflow, the cybersecurity event detection and response service may function to generate a service-validated security alert having at least an alert name (e.g., suspicious authentication activity), a corresponding MITRE Tactic category (e.g., TA0001—Initial Access), a corresponding service-specific alert category (e.g., suspicious authentication), and/or a corresponding threat severity (e.g., low threat severity).

Additionally, or alternatively, in one or more embodiments, S240 may function to instantiate, via the detection-building graphical user interface, a detection instruction response container based on receiving an input, from the user, selecting a detection instruction response control button of the detection-building graphical user interface. The detection instruction response container, in one or more embodiments, may include a set of user interface input elements configured to receive user input specifying alert attributes when creating a subject prospective security alert. For instance, the set of user interface input elements may include a first user interface input element configured to receive an input of an alert name that is assigned to the subject prospective security alert when the one or more alert generation conditions of the target automated detection instruction are satisfied, a second user interface input element configured to receive an input of a degree of threat severity that is assigned to the subject prospective security alert when the one or more alert generation conditions of the target automated detection instruction are satisfied, and a third user interface input element configured to receive an input of a security threat classification or attack strategy that is assigned to the subject prospective security alert when the one or more alert generation conditions of the target automated detection instruction are satisfied.

In other words, the target automated detection instruction (e.g., target computer-executable detection instruction) generated via the aforementioned detection-building graphical user interface will always generate a subject prospective security alert of the same degree of threat severity, alert name, and the security threat classification or attack strategy metadata for each technology source-agnostic security event signal that satisfies the conditions of the target automated detection instruction (e.g., if a subject technology source-agnostic security event signal satisfies the set of alerting conditions of the target automated detection instruction, generate a prospective security alert with these alert attributes as specified in the detection instruction response container). It shall be further recognized, in one or more embodiments, a system or service implementing method 200 may function to implement or deploy the target automated detection instruction (e.g., target computer-executable detection instruction) into one or more production environments based on receiving an input, from the user, selecting a "deploy detection instruction" user interface element (or the like) on the detection-building graphical user interface.

2.50 Routing Service-Validated Security Alerts

S250, which includes routing service-validated security alerts, may function to route each service-validated security alert generated by the cybersecurity event detection and response service to one of an alert handling queue and an alert disposal queue. It shall be recognized that the phrase "service-validated security alert" may also be referred to herein as a "prospective security alert" or the like.

In one or more embodiments, based on the cybersecurity event detection and response service, generating a service-validated security alert, the cybersecurity event detection and response service may function to assess the service-validated security alert against a corpus of computing environment-informative data of a target subscriber (e.g., a corpus of subscriber context data) to which the service-validated security alert (e.g., prospective security alert) corresponds. The corpus of computing environment-informative data may include alert suppression instructions associated with non-critical digital assets of the subscriber, alert escalation instructions associated with critical digital assets of the subscriber, etc., as described in U.S. patent application Ser. No. 18/095,754, titled SYSTEMS AND METHODS FOR INTELLIGENTLY GENERATING CYBERSECURITY CONTEXTUAL INTELLIGENCE AND GENERATING A CYBERSECURITY INTELLIGENCE INTERFACE and U.S. patent application Ser. No. 18/129,638, titled SYSTEMS AND METHODS FOR INTELLIGENT CONFIGURATION AND DEPLOYMENT OF ALERT SUPPRESSION PARAMETERS IN A CYBERSECURITY THREAT DETECTION AND MITIGATION PLATFORM, which are incorporated in their entities by this reference.

Figure 9:
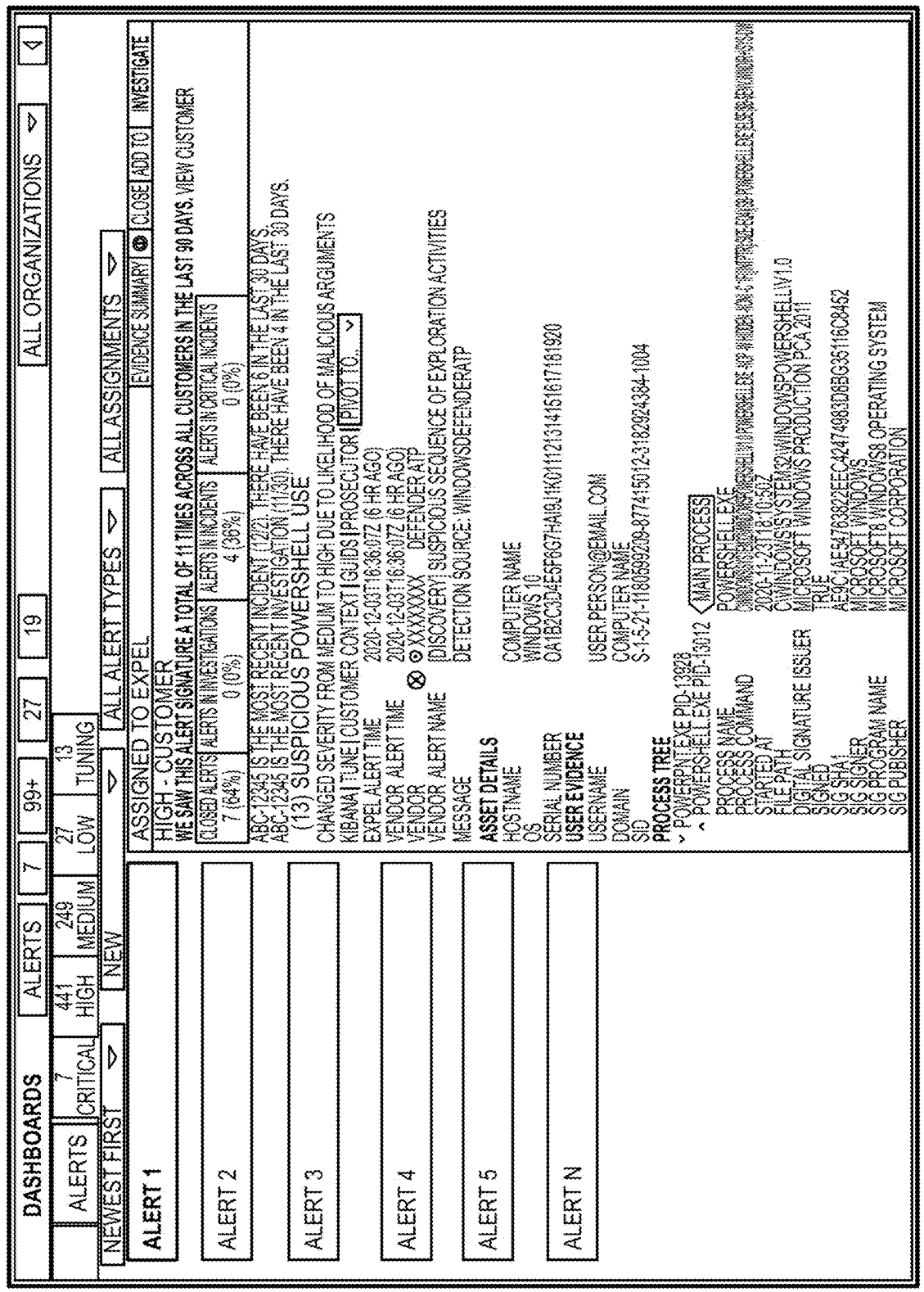
FIG. 9 illustrates an example representation of an alert handling queue displayed on a graphical user interface in accordance with one or more embodiments of the present application.
Figure 17:
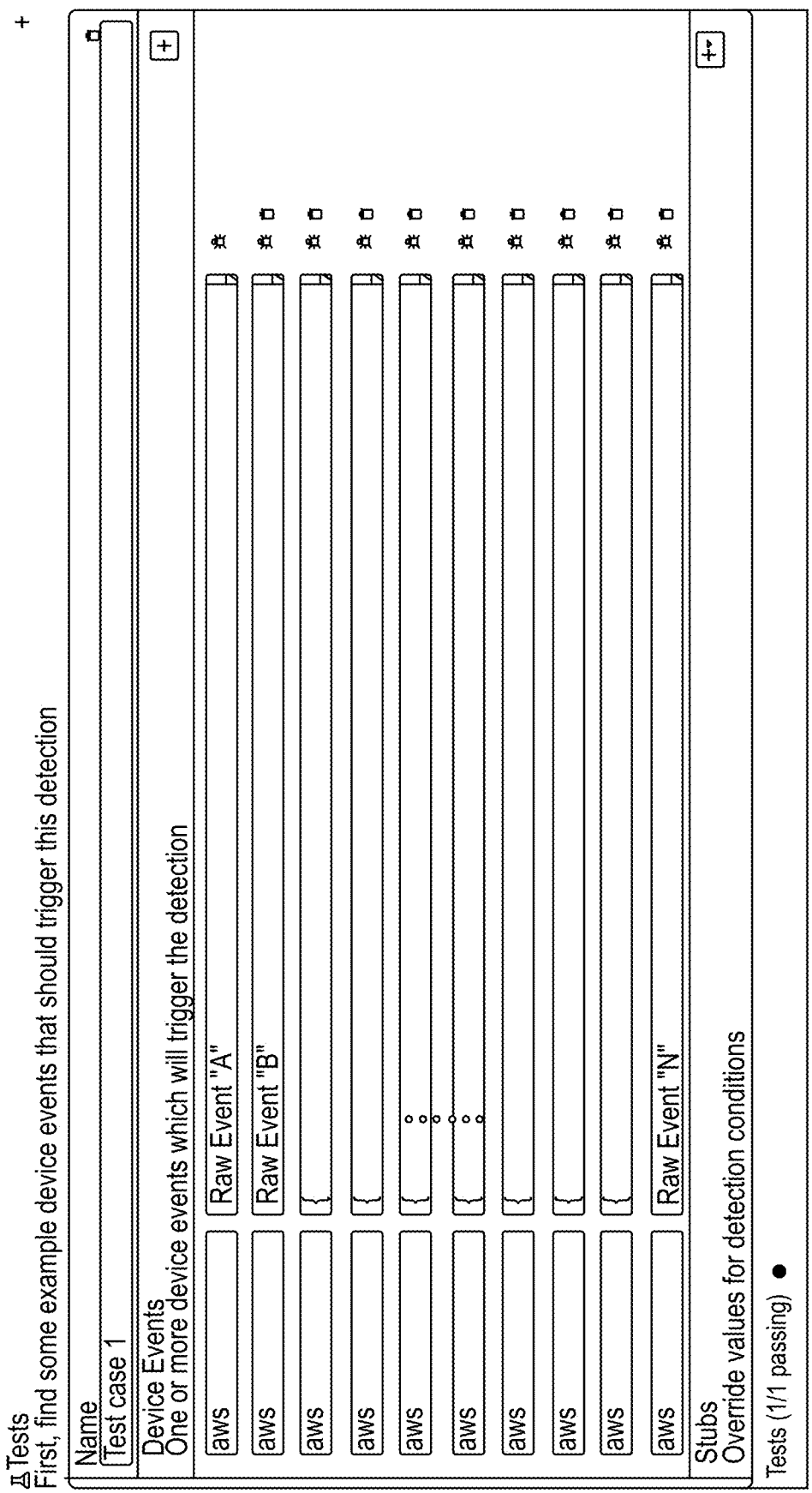

In one or more embodiments, based on a determination that the service-validated security alert (e.g., prospective security alert or the like) is associated with one of the critical digital assets of the corpus of computing environment-informative data of the target subscriber, S250 may function to automatically route the service-validated security alert to an alert handling queue. It shall be noted that, in one or more embodiments, a representation of the alert handling queue may be displayed on a graphical user interface, as shown generally by way of example in FIG. 9.

In one or more embodiments, based on a determination that the service-validated security alert includes alert data associated with one of the non-critical digital assets of the corpus of computing environment-informative data of the target subscriber, S250 may function to automatically route the service-validated security alert to an alert disposal queue.

It shall be noted, in some embodiments, S250 may function to automatically route a subject service-validated security alert to the alert handling queue (e.g., bypassing an assessment of a corpus of computing environment-informative data against the subject service-validated security alert).

At least one technical advantage of evaluating service-validated security alerts against one or more corpora of computing environment-informative data is that it may prevent a display or surfacing of service-validated security alerts that may be deemed irrelevant (e.g., noise) by a subject subscriber to which the service-validated security alert corresponds.

Stated another way, in one or more embodiments, the system or service implementing method 200 may function to obtain, via one or more processors, a third-party security event that involves a digital asset or computing asset of a subscriber. Additionally, in such an embodiment, the system or service implementing method 200 may function to generate, via the one or more processors, a technology source-agnostic security event signal for the third-party security event based on routing the third-party security event to an event normalization service. Additionally, in such an embodiment, the system or service implementing method 200 may function to identify, via the one or more processors, a technology source-agnostic security event signal type that corresponds to the technology source-agnostic security event signal in response to generating the technology source-agnostic security event signal. Additionally, in such an embodiment, the system or service implementing method 200 may function to retrieve, via the one or more processors, a corpus of computer-executable detection instructions digitally mapped to the technology source-agnostic security event signal type based on querying a detection instructions retrieval application programming interface (API). Additionally, in such an embodiment, the system or service implementing method 200 may function to assess, via the one or more processors, the technology source-agnostic security event signal against each computer-executable detection instruction included in the corpus of computer-executable detection instructions. Additionally, in such an embodiment, the system or service implementing method 200 may function to generate, via the one or more processors, a prospective security alert based on the technology source-agnostic security event signal satisfying a set of alerting conditions of one of the computer-executable detection instructions of the corpus of computer-executable detection instructions.

Accordingly, in one or more embodiments, the system or service implementing method 200 may function to assess, via the one or more processors, the prospective security alert against a corpus of computing environment data of the subscriber, determine, via the one or more processors, the prospective security alert involves a critical computing asset of the subscriber based on assessing the prospective security alert against the corpus of computing environment data of the subscriber, and/or route, via the one or more processors, the prospective security alert to an alert queue based on the prospective security alert being a valid security alert.

Accordingly, in one or more embodiments, the system or service implementing method 200 may function to assess, via the one or more processors, the prospective security alert against one or more alert suppression instructions configured for the subscriber, identify, via the one or more processors, the prospective security alert as a suppressible alert based on the prospective security alert satisfying one of the one or more alert suppression instructions, and/or route, via the one or more processors, the prospective security alert to an alert disposal queue based on the prospective security alert being identified as the suppressible alert.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for accelerating a detection of a cybersecurity threat, the method comprising:
   obtaining, via one or more processors, a third-party security event that involves a digital asset or computing asset of a subscriber;
   generating a technology source-agnostic security event signal for the third-party security event based on routing the third-party security event to an event normalization service;
   identifying, via the one or more processors, a technology source-agnostic security event signal type that corresponds to the technology source-agnostic security event signal in response to generating the technology source-agnostic security event signal;
   retrieving, via the one or more processors, a corpus of computer-executable detection instructions digitally mapped to the technology source-agnostic security event signal type based on querying a detection instructions retrieval application programming interface (API);
   assessing, via the one or more processors, the technology source-agnostic security event signal against each computer-executable detection instruction included in the corpus of computer-executable detection instructions;

generating, via the one or more processors, a prospective security alert based on the technology source-agnostic security event signal satisfying a set of alerting conditions of one of the computer-executable detection instructions of the corpus of computer-executable detection instructions; and instantiating, via the one or more processors, a detection-building graphical user interface for constructing a target automated detection instruction based on receiving a request from a user, wherein the detection-building graphical user interface includes:

a plurality of detection-identifying user interface input elements configured to receive, from the user, one or more strings of text that characterize the target automated detection instruction, and a set of user interface buttons, that when operated, is configured to control whether the target automated detection instruction is used for only the subscriber or across all subscribers subscribing to a cybersecurity event detection and response service.

2. The computer-implemented method according to claim 1, wherein:

the one of the computer-executable detection instructions of the corpus of computer-executable detection instructions is configured to assign a predetermined degree of threat severity to the prospective security alert based on the technology source-agnostic security event signal satisfying the set of alerting conditions of the one of the computer-executable detection instructions, the one of the computer-executable detection instructions of the corpus of computer-executable detection instructions is configured to assign a predetermined alert name to the prospective security alert based on the technology source-agnostic security event signal satisfying the set of alerting conditions of the one of the computer-executable detection instructions, and the one of the computer-executable detection instructions of the corpus of computer-executable detection instructions is configured to assign a predetermined security threat classification or attack strategy to the prospective security alert based on the technology source-agnostic security event signal satisfying the set of alerting conditions of the one of the computer-executable detection instructions.

3. The computer-implemented method according to claim 1, further comprising:

assessing, via the one or more processors, the prospective security alert against a corpus of computing environment data of the subscriber;

determining, via the one or more processors, the prospective security alert involves a critical computing asset of the subscriber based on assessing the prospective security alert against the corpus of computing environment data of the subscriber; and routing, via the one or more processors, the prospective security alert to an alert queue based on the prospective security alert being a valid security alert.

4. The computer-implemented method according to claim 1, further comprising:

assessing, via the one or more processors, the prospective security alert against one or more alert suppression instructions configured for the subscriber;

identifying, via the one or more processors, the prospective security alert as a suppressible alert based on the prospective security alert satisfying one of the one or more alert suppression instructions; and routing, via the one or more processors, the prospective security alert to an alert disposal queue based on the prospective security alert being identified as the suppressible alert.

5. The computer-implemented method according to claim 1, wherein:

the third-party security event is one of:

a raw security event obtained from a security information and event management (SIEM) security device associated with the subscriber, a raw security event obtained from a third-party security device or third-party security application, and a raw security event obtained from a cloud-based security device that is configured to monitor a cloud environment of the subscriber.

6. The computer-implemented method according to claim 1, wherein:

each distinct computer-executable detection instruction of the corpus of computer-executable detection instructions is configured to assess the technology source-agnostic security event signal against a distinct set of predefined alerting conditions, and each distinct computer-executable detection instruction of the corpus of computer-executable detection instructions is configured to generate a corresponding prospective security alert based on satisfying the distinct set of predefined alerting conditions associated with that distinct computer-executable detection instruction.

7. The computer-implemented method according to claim 6, wherein:

the corpus of computer-executable detection instructions includes a first computer-executable detection instruction, a second computer-executable detection instruction, and a third computer-executable detection instruction, the first computer-executable detection instruction is configured to generate a first type of prospective security alert based on the technology source-agnostic security event signal satisfying the distinct set of predefined alerting conditions of the first computer-executable detection instruction, the second computer-executable detection instruction is configured to generate a second type of prospective security alert based on the technology source-agnostic security event signal satisfying the distinct set of predefined alerting conditions of the second computer-executable detection instruction, the third computer-executable detection instruction is configured to generate a third type of prospective security alert based on the technology source-agnostic security event signal satisfying the distinct set of predefined alerting conditions of the third computer-executable detection instruction, and the first type of prospective security alert, the second type of prospective security alert, and the third type of prospective security alert each correspond to a distinct type of prospective security alert.

8. The computer-implemented method according to claim 1, wherein:

the corpus of computer-executable detection instructions digitally mapped to the technology source-agnostic security event signal type includes a first plurality of computer-executable detection instructions, a second corpus of computer-executable detection instructions digitally mapped to a second technology source-agnostic security event signal type includes a second plurality of computer-executable detection instructions, and a total number of computer-executable detection instructions included in the corpus of computer-executable detection instructions is different from a total number of computer-executable detection instructions included in the second corpus of computer-executable detection instructions.

9. The computer-implemented method according to claim 1, wherein:

querying the detection instructions retrieval application programming interface (API) includes automatically constructing, via the one or more processors, an API call that includes the technology source-agnostic security event signal type as a search parameter, and receiving the corpus of computer-executable detection instructions digitally mapped to the technology source-agnostic security event signal type is further based on executing the API call.

10. The computer-implemented method according to claim 1, wherein:

a first subset of computer-executable detection instructions of the corpus of computer-executable detection instructions includes a set of heuristics-based detection instructions, and a second subset of computer-executable detection instructions of the corpus of computer-executable detection instructions includes a set of machine learning-based detection instructions that includes using one or more machine learning models.

11. The computer-implemented method according to claim 1, wherein:

the detection-building graphical user interface further includes an automated investigations control button that, when selected, is configured to display a drop-down menu element of a plurality of alert taxonomies, the automated investigations control button is configured to receive a selection, from the user, of one of the plurality of alert taxonomies, and the target automated detection instruction, when executed, is configured to execute a set of automated investigation workflows digitally mapped to the one of the plurality of alert taxonomies based on receiving the selection of the one of the plurality of alert taxonomies from the user.

12. The computer-implemented method according to claim 1, further comprising:

instantiating, via the detection-building graphical user interface, a detection instruction simulation container based on receiving an input, from the user, selecting a detection simulation addition control button of the detection-building graphical user interface, wherein the detection instruction simulation container is configured to receive, from the user, input of:

a sample raw event generated by a target third-party security service or a target third-party security application for validating that the target automated detection instruction is executed correctly in response to normalizing the sample raw event and providing the normalized sample raw event to the target automated detection instruction.

13. The computer-implemented method according to claim 1, further comprising:

instantiating, via the detection-building graphical user interface, a detection instruction execution container based on receiving an input, from the user, selecting a detection instruction execution control button of the detection-building graphical user interface, wherein the detection instruction execution container includes:

a signal type user interface element that, when selected, displays a drop-down menu element of a plurality of technology source-agnostic event signal types provided by the cybersecurity event detection and response service, and one or more condition-setting user interface elements being configured to receive inputs of characters that define one or more alert generation conditions that must be satisfied prior to generating a subject prospective security alert using the target automated detection instruction.

14. The computer-implemented method according to claim 1, further comprising:

instantiating, via the detection-building graphical user interface, a detection instruction response container based on receiving an input, from the user, selecting a detection instruction response control button of the detection-building graphical user interface, wherein the detection instruction response container includes:

a set of user interface input elements configured to receive user input specifying alert attributes of the subject prospective security alert, wherein the set of user interface input elements includes:

a first user interface input element configured to receive an input of an alert name that is assigned to the subject prospective security alert when the one or more alert generation conditions are satisfied, a second user interface input element configured to receive an input of a degree of threat severity that is assigned to the subject prospective security alert when the one or more alert generation conditions are satisfied, and a third user interface input element configured to receive an input of a security threat classification or attack strategy that is assigned to the subject prospective security alert when the one or more alert generation conditions are satisfied.

15. A computer-program product embodied in a non-transitory machine-readable storage medium storing computer instructions that, when executed by one or more processors, perform operations comprising:

receiving a third-party security event that involves a digital asset or computing asset of a subscriber;

generating a technology source-agnostic security event signal for the third-party security event based on routing the third-party security event to an event normalization service;

identifying a technology source-agnostic security event signal type corresponding to the technology source-agnostic security event signal in response to generating the technology source-agnostic security event signal;

obtaining a corpus of computer-executable detection instructions digitally mapped to the technology source-agnostic security event signal type based on querying a detection instructions retrieval application programming interface (API);

assessing the technology source-agnostic security event signal against each computer-executable detection instruction included in the corpus of computer-executable detection instructions;

generating at least one prospective security alert based on the technology source-agnostic security event signal satisfying a set of alerting conditions of at least one of the computer-executable detection instructions of the corpus of computer-executable detection instructions; and instantiating a detection-building graphical user interface for constructing a target automated detection instruction based on receiving a request from a user, wherein the detection-building graphical user interface includes:
 a plurality of detection-identifying user interface input elements configured to receive, from the user, one or more strings of text that characterize the target automated detection instruction, and
 a set of user interface buttons, that when operated, is configured to control whether the target automated detection instruction is used for only the subscriber or across all subscribers subscribing to a cybersecurity event detection and response service.

16. The computer-program product according to claim 15, wherein:
 generating the at least one prospective security alert includes generating a first prospective security alert of a first type and a second prospective security alert of a second type that is different than the first type,
 the at least one of the computer-executable detection instructions of the corpus of computer-executable detection instructions generates the first prospective security alert and the second prospective security alert.

17. The computer-program product according to claim 15, wherein:
 generating the at least one prospective security alert includes:
  generating a first prospective security alert of a first type based on satisfying a set of alerting conditions of a first computer-executable detection instruction of the corpus of computer-executable detection instructions,
  generating a second prospective security alert of a second type based on satisfying a set of alerting conditions of a second computer-executable detection instruction of the corpus of computer-executable detection instructions, and
  the first computer-executable detection instruction and the second computer-executable detection instruction are different computer-executable detection instructions.

18. The computer-program product according to claim 15, wherein:
 the corpus of computer-executable detection instructions only includes computer-executable detection instructions that are configured to evaluate subject technology source-agnostic security event signals of the technology source-agnostic security event signal type.

19. The computer-program product according to claim 15, wherein:
 the technology source-agnostic security event signal is processable by the cybersecurity event detection and response service irrespective of a third-party security device or service from which the third-party security event originated.

\* \* \* \* \*